United States Patent
Ren et al.

(10) Patent No.: US 8,340,641 B2
(45) Date of Patent: Dec. 25, 2012

(54) AGGREGATED MULTI-NUMBER VISUAL VOICEMAIL SERVER

(75) Inventors: Dahai Ren, Waltham, MA (US); Jack Jianxiu Hao, Lexington, MA (US); Robert C Baruch, Rising Sun, MD (US); Genevieve Cerf, Groton Long Point, CT (US); Shuai Wu, Waltham, MA (US); Gaurav D Mehta, Brighton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 418 days.

(21) Appl. No.: 12/633,095

(22) Filed: Dec. 8, 2009

(65) Prior Publication Data

US 2011/0136474 A1 Jun. 9, 2011

(51) Int. Cl.
H04M 1/725 (2006.01)
H04M 11/10 (2006.01)
H04M 3/42 (2006.01)

(52) U.S. Cl. .................. 455/412.1; 455/412.2; 455/413; 379/211.02

(58) Field of Classification Search ............... 455/412.1, 455/412.2, 413; 379/211.02
See application file for complete search history.

(56) References Cited

U.S. PATENT DOCUMENTS

2006/0276179 A1* 12/2006 Ghaffari et al. ............ 455/412.2

* cited by examiner

Primary Examiner — Kamran Afshar
Assistant Examiner — Omoniyi Obayanju

(57) ABSTRACT

A system, in which a server is connected to a group of voicemail servers, is provided. A first voicemail server provides voicemail services to landline telephone devices. A second voicemail server provides voicemail services to wireless telephone devices. The server receives information regarding a first voicemail intended for a user of a user device, receives information regarding a second voicemail intended for the user of the user device, aggregates the information regarding the first voicemail and the information regarding the second voicemail as aggregated information, and sends the aggregated information to the user device.

21 Claims, 15 Drawing Sheets

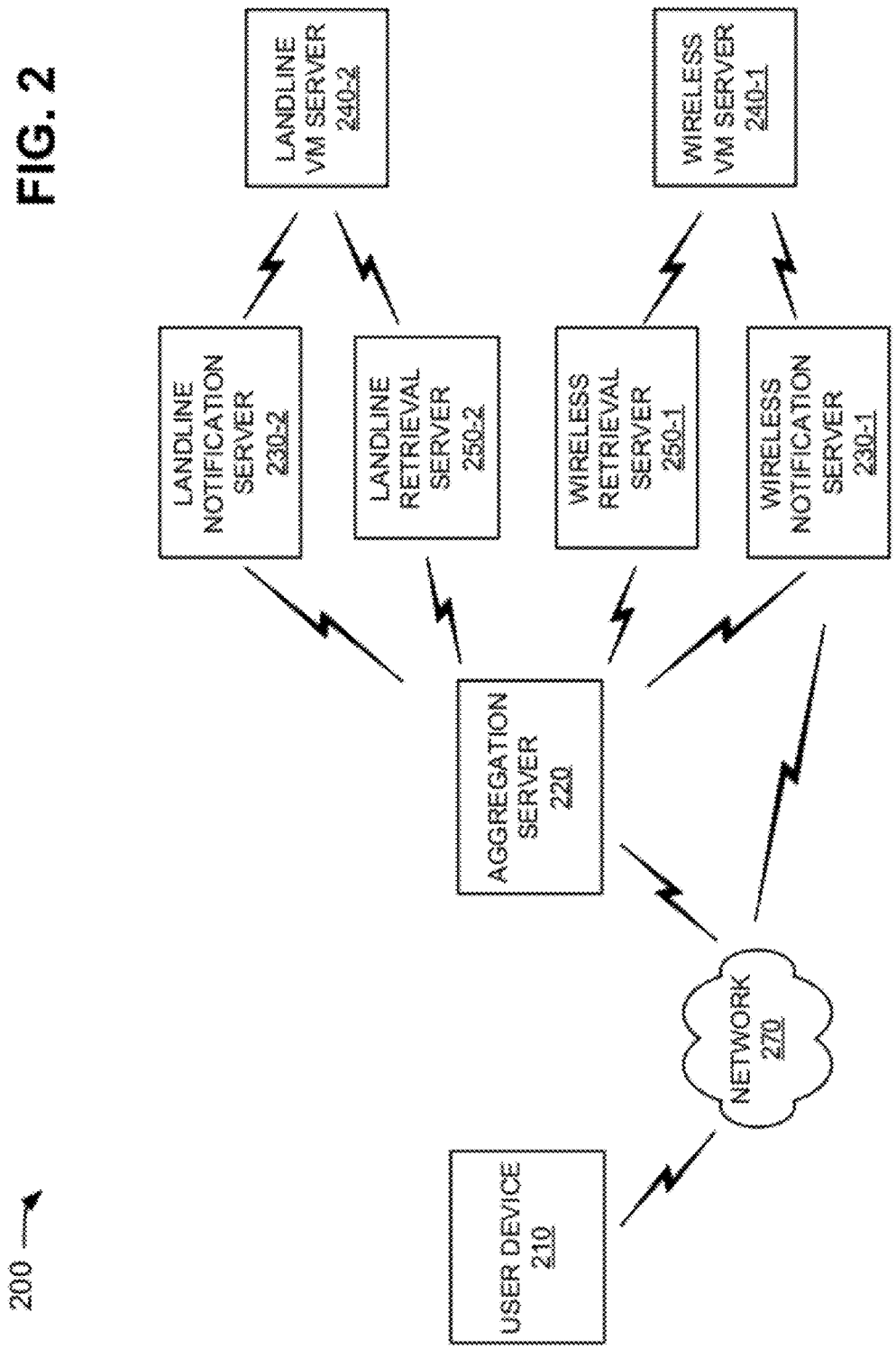

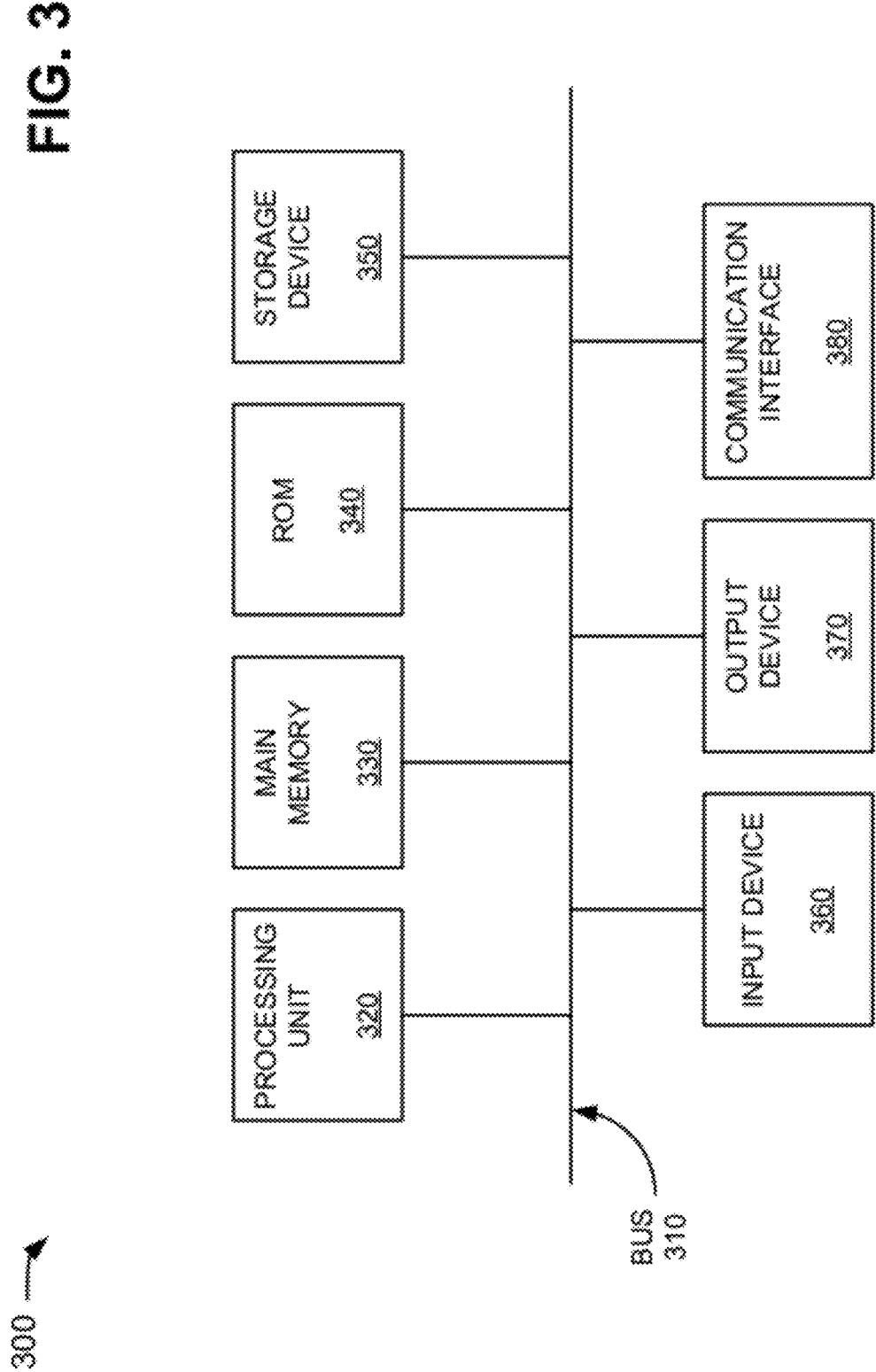

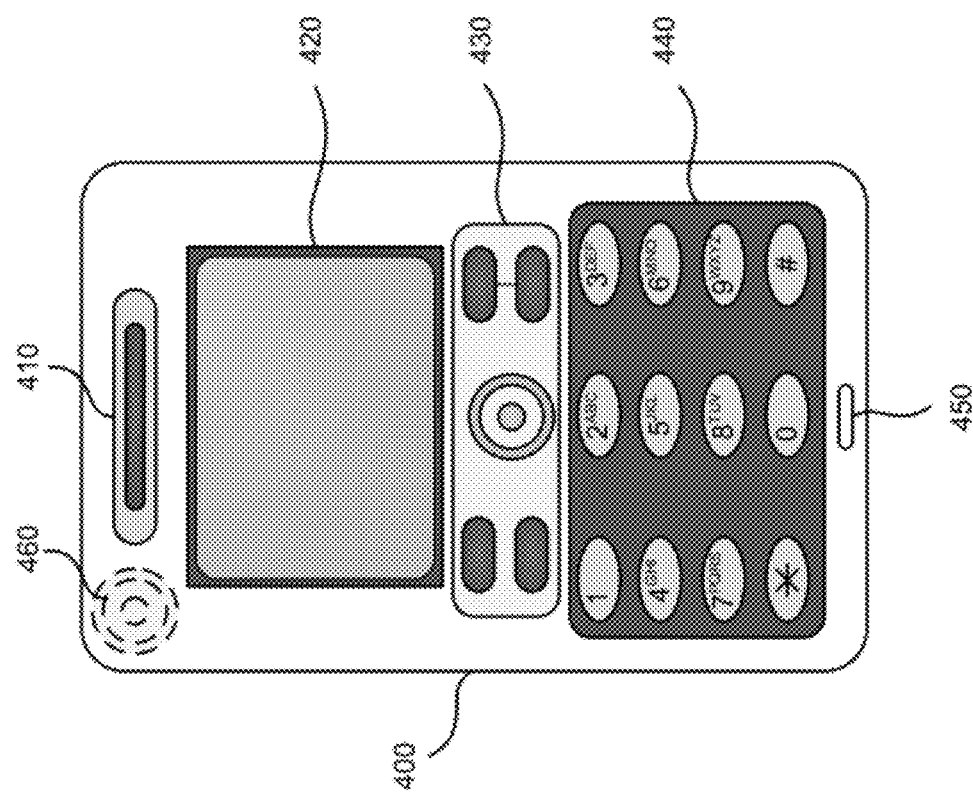

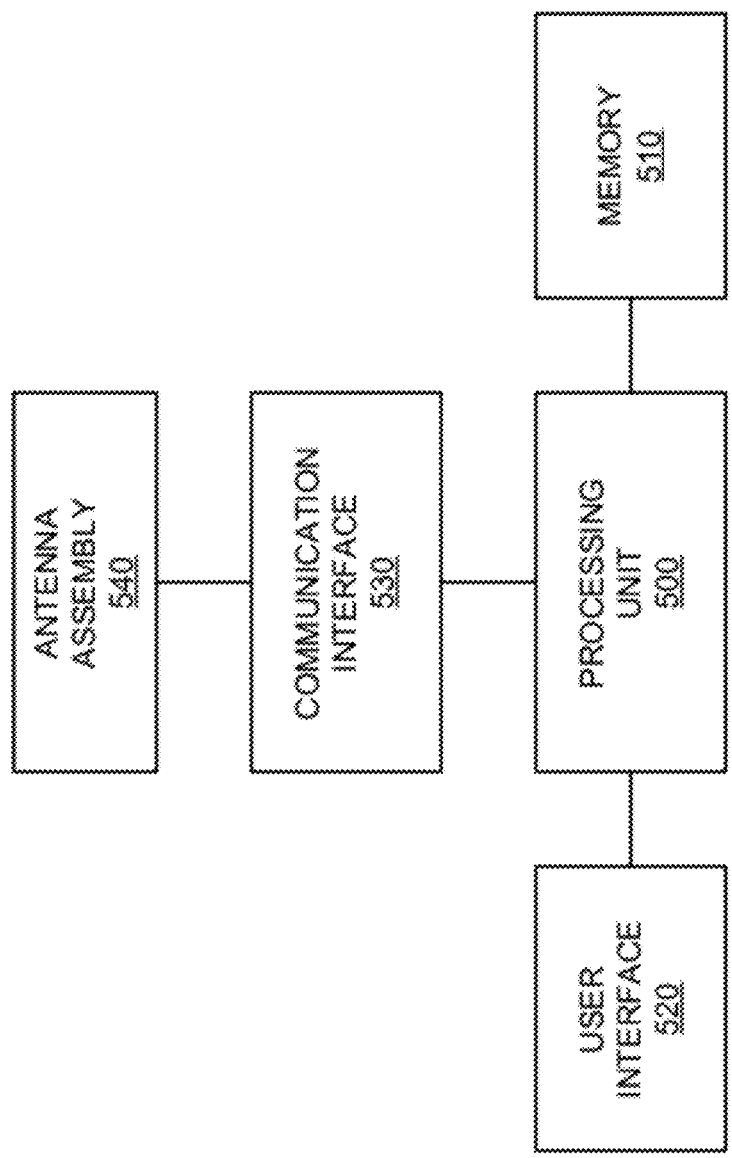

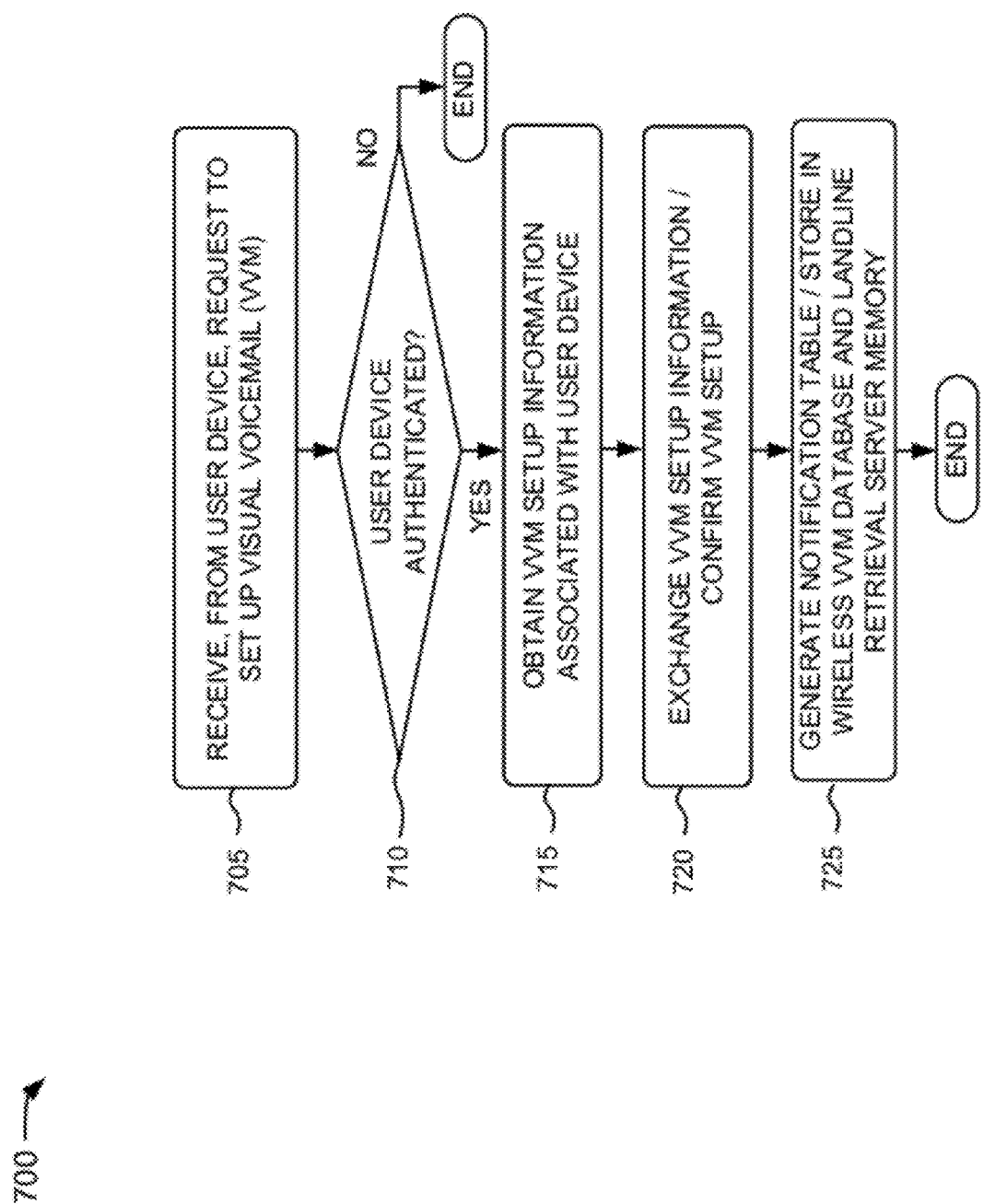

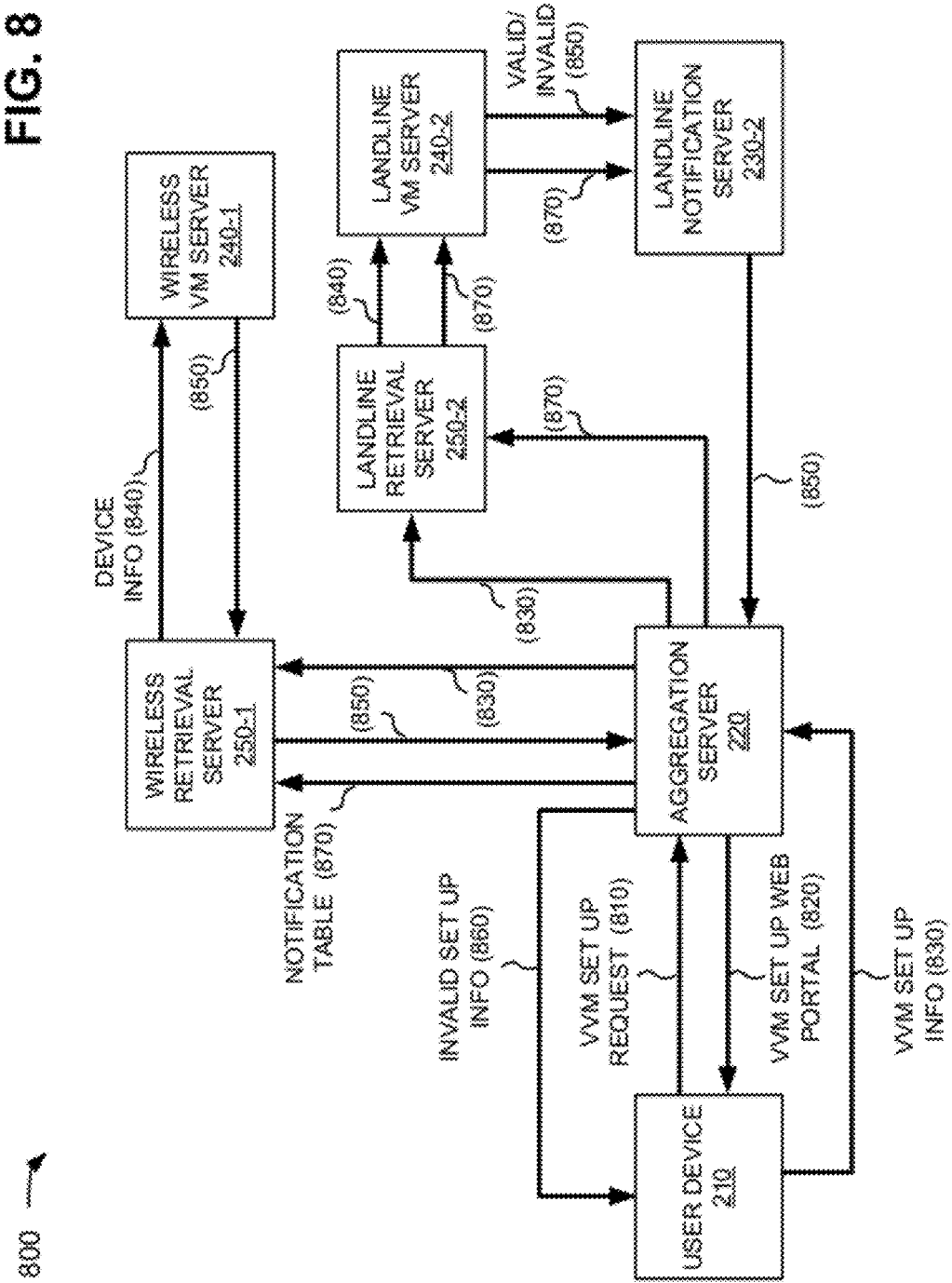

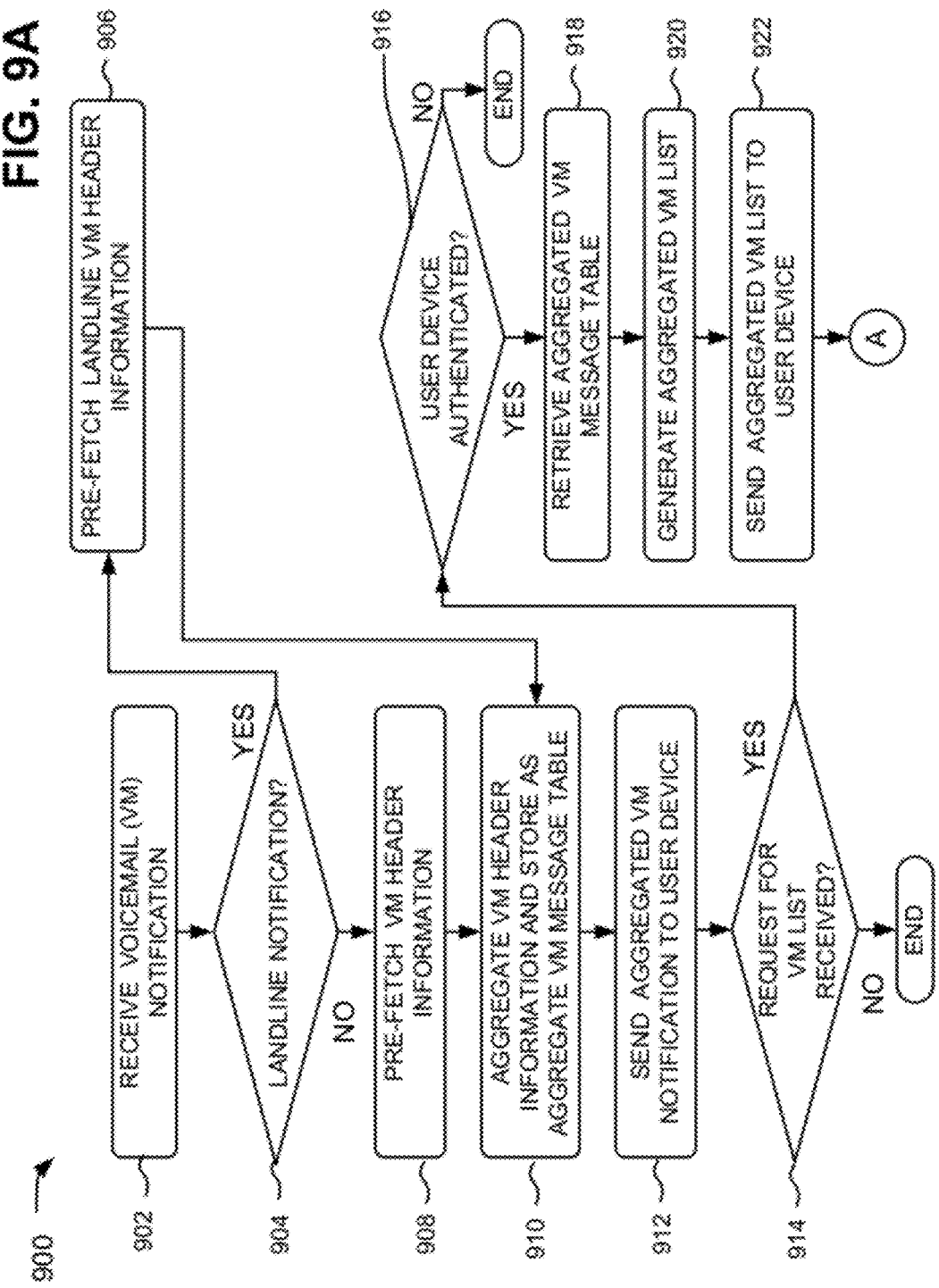

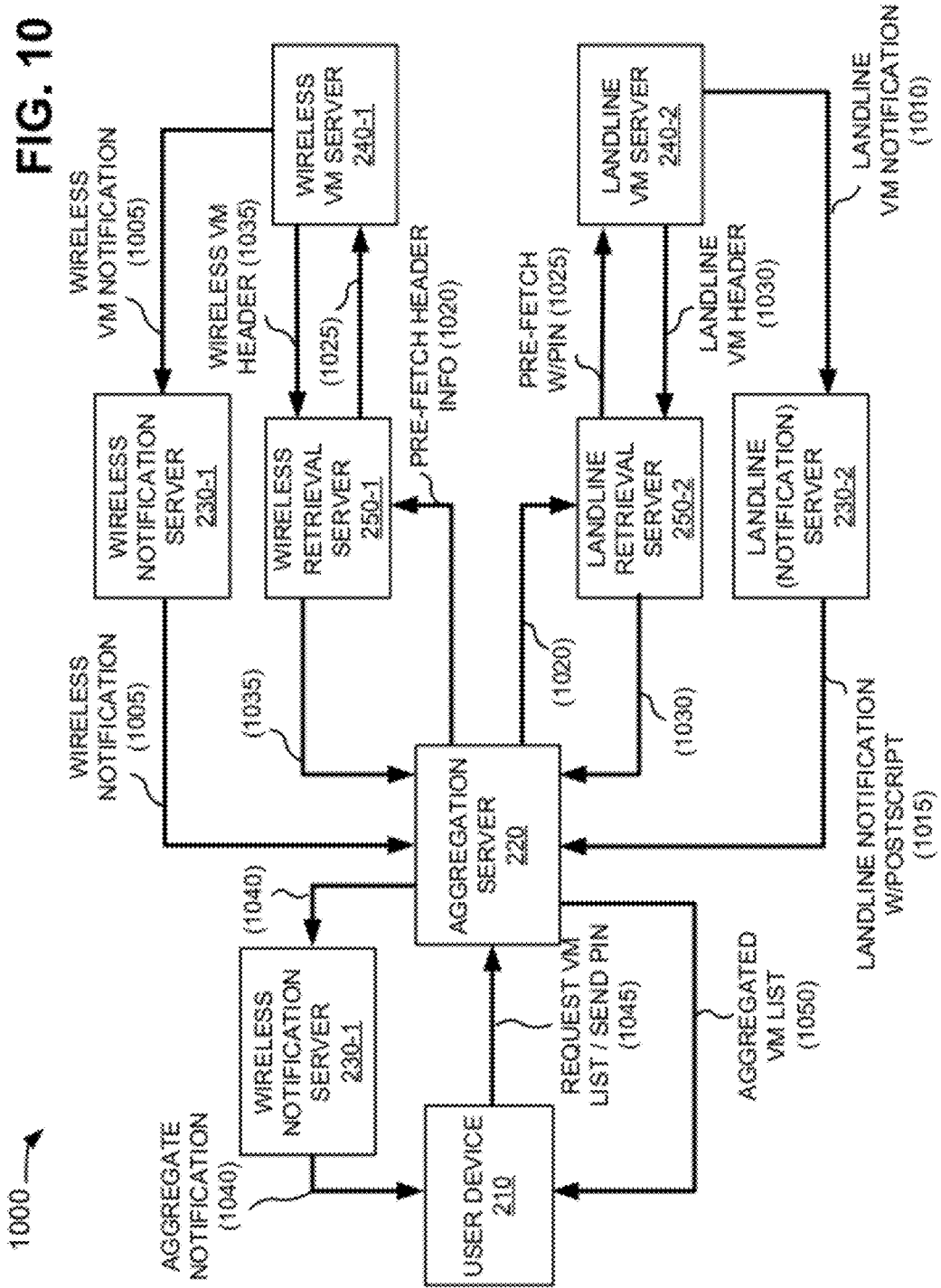

FIG. 11

| SETUP TABLE 1100 | | | |
|---|---|---|---|
| USER ID 1102 | CALLED DN 1104 | CALLED DEVICE INFO 1106 | VM SERVERS 1108 |
| 5678, JSMITH, PASSWORD3 | 2022513434<br>2023459292<br>7035678989 | 1234, JSMITH, PASSWORD1<br>4321, JSMITH, PASSWORD2<br>5678, JSMITH, PASSWORD3 | LANDLINE VM SERVER 240A<br>LANDLINE VM SERVER 240B<br>WIRELESS VM SERVER 240C |

AGGREGATED MULTI-NUMBER VISUAL VOICEMAIL SERVER

BACKGROUND

Visual voicemail is a user friendly application that adds a visual aspect to managing voicemail messages. Visual voicemail may enable users to manage voicemail messages in an order of their choice, e.g., in a user-selected order rather than a sequential order. However, visual voicemail applications may be constrained by limited access to, or management of, voicemail associated with home, office or other telephones connected by landline networks.

BRIEF DESCRIPTION OF THE DRAWINGS

FIG. 2 is a block diagram of an exemplary network in which systems and/or methods described herein may be implemented;

FIG. 3 is a diagram of exemplary components of one or more of the devices of FIG. 2;

FIG. 4 is a diagram of an exemplary user device of FIG. 2;

FIG. 5 is a diagram of exemplary components of the user device of FIG. 4;

FIG. 7 is a flow chart of an exemplary process for setting up multi-number VVM for a user device within the network of FIG. 2;

FIG. 8 is an exemplary multi-number VVM set-up operation capable of being performed by an exemplary portion of the network illustrated in FIG. 2;

FIGS. 9A and 9B are flow charts of an exemplary process for interacting with a multi-number VVM system within an exemplary portion of the network of FIG. 2;

FIG. 10 is a diagram of an exemplary multi-number VVM operation capable of being performed by an exemplary portion of the network illustrated in FIG. 2;

FIG. 11 is a diagram of an exemplary VVM set up table capable of being used by the multi-number VVM system of FIG. 2.

DETAILED DESCRIPTION OF PREFERRED EMBODIMENTS

Figure 1:
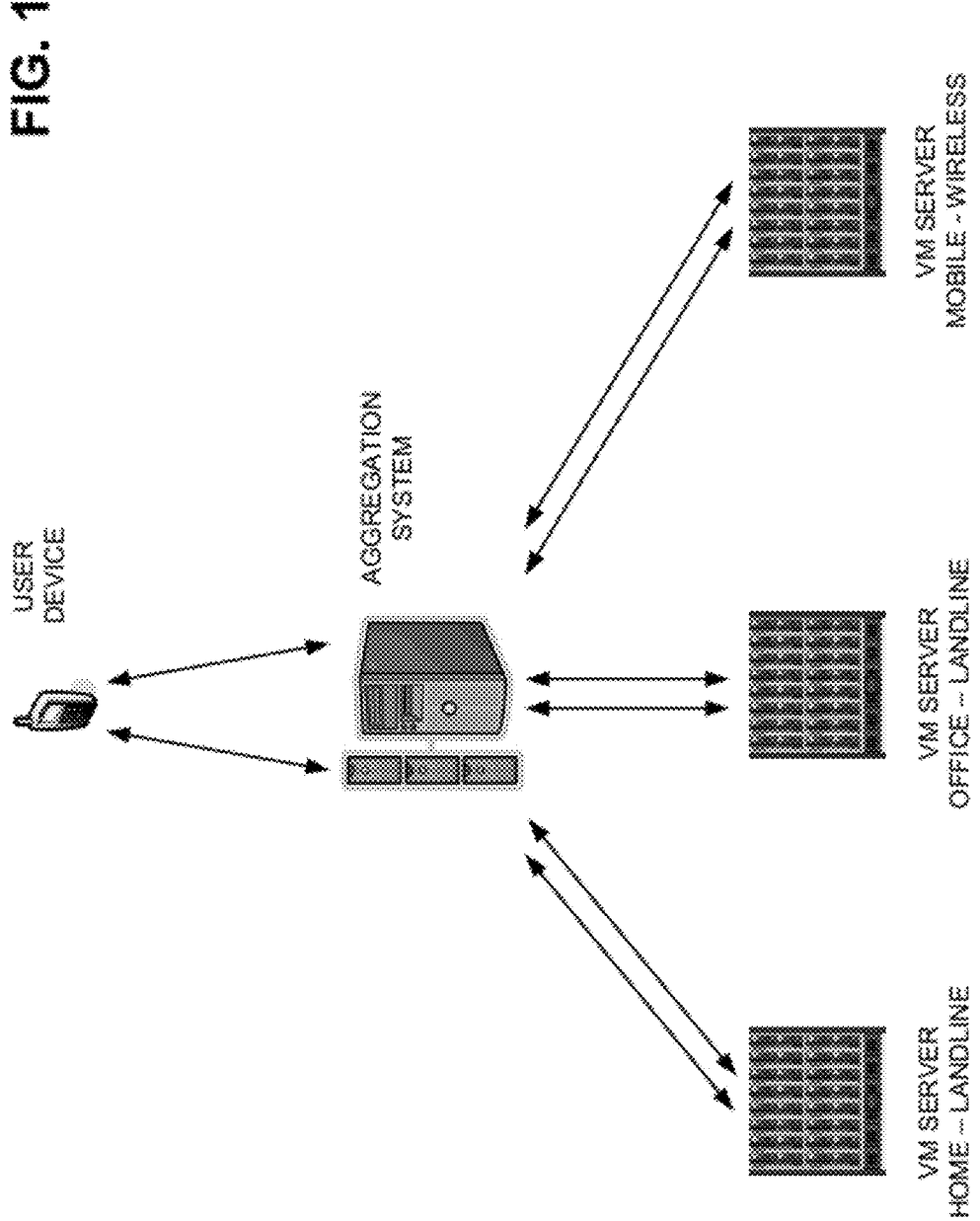
FIG. 1 is a diagram of an overview of a visual voicemail (VVM) implementation described herein.

The following detailed description refers to the accompanying drawings. The same reference numbers in different drawings may identify the same or similar elements. Also, the following detailed description does not limit the invention.

Systems and/or methods described herein may provide a multi-number visual voicemail (VVM) system, which includes an aggregation server that may enable a user device to access and retrieve voicemail from multiple voicemail boxes associated with wireless and/or landline devices, such as home, office and/or wireless devices. The aggregation server may manage communications with voicemail servers containing the voicemail boxes of wireless and/or landline devices and may present voicemail information to a user device in a manner that enables a user to review and/or manage voicemail in any order the user chooses. The user may experience the same VVM look and feel regardless of whether received voicemail comes from a mailbox associated with a user's landline device or wireless device. Furthermore, the aggregation server may aggregate voicemail information from voicemail boxes associated with different wireless and/or landline devices (e.g., home, office and/or other wireless devices) and present the voicemail information to a user device that may display a user interface containing the aggregated voicemail information for a user to view and/or manage as if the voicemail originated from a single voicemail server. Additionally, the aggregated voicemail information may provide single-point access to voicemail that enables the user to review and manage voicemail from a single location, with a single device and within a single voicemail session that may reduce the time required to access and/or retrieve voicemails from multiple voicemail boxes associated with wireless and/or landline devices.

Moreover, multi-number VVM may provide greater access to voicemail (e.g., 24 hours per day/seven days per week), at reduced time and/or cost, by enabling remote and/or single-point access to voicemail. Single-point remote access may reduce or eliminate a user's need to be co-located and/or to travel to the location where a particular wireless and/or landline device is located in order to access voicemail associated with a particular device. The aggregation server may manage multiple communications (e.g., data calls to and/or from) with the backend voicemail (VM) servers and may aggregate information received during backend communications into fewer communications with the user device, which may shift the bulk of communications from the more expensive and slower device-to-server and/or server-to-device communication to the less expensive and faster server-to-server communications. The aggregation server may also provide for more secure communications with the user device and backend VM servers by reducing the quantity of less secure device-to-server communications and simplifying the authentication process by reducing the quantity of communications to perform user device authentication.

In one implementation, the aggregation server may receive, from a user device, a request to retrieve voicemail information from multiple voicemail boxes associated with wireless and/or landline devices (e.g., home, office and/or other wireless devices). The aggregation server may retrieve voicemail information from backend VM servers and/or VVM servers associated with the landline and/or wireless devices. Further, the aggregation server may aggregate the retrieved voicemail information and may combine the aggregated voicemail information with user interface information that may be delivered to the user device that enables a user (e.g., the user of a user device) to view, listen to and/or manage voicemail.

As used herein, the term "user" is intended to be broadly interpreted to include a user device or a user of a user device.

FIG. 1 is a diagram of an overview of a visual voicemail (VVM) implementation described herein. As shown in FIG. 1, an aggregation system may bridge communications between a user device and a group of VM servers. Each of the VM servers may contain voicemail boxes associated with the user's (e.g., a user of the user device) landline and/or wireless devices (e.g., home, office and/or wireless devices, etc.). The aggregation system may enable a user to have single-point remote access (e.g., from a user device) to multiple voicemail boxes associated with the user's landline and/or wireless devices.

For example, landline devices may include a user's home telephone, which may have a corresponding voicemail box, contained within a VM server's memory (shown as VM server home—landline), and may be connected via a landline connection. Another example may include a user's office telephone, which may have a corresponding voicemail box, contained within a VM server's memory (shown as VM server office—landline), and may be connected via a landline connection. Yet another example may include a user's wireless device, which may have a corresponding voicemail box, contained within a VM server's memory (shown as VM server mobile—wireless), and may be connected via a wireless connection.

The aggregation system, on behalf of the user device, may facilitate and manage communications with the VM servers by obtaining, via a series of data calls, voicemail information from the voicemail boxes associated with the user's landline and/or wireless devices. The aggregation system may aggregate the obtained voicemail information and combine the aggregated voicemail information with a user interface and present the user interface to the user device that enables a user (e.g., the user of the user device) to view, listen to and/or manage voicemail.

FIG. 2 is a diagram of an exemplary network 200 in which systems and/or methods described herein may be implemented. Network 200 may include a user device 210, an aggregation server 220, a wireless notification server 230-1, a landline notification server 230-2, a group of VM servers 240-1 and 240-2 (referred to generally as "VM servers 240"), a landline retrieval server 250-2, a wireless retrieval server 250-1, and/or a network 270. Components of network 200 may interconnect via wired and/or wireless connections. A single user device 210, aggregation server 220, wireless notification server 230-1, landline notification server 230-2, wireless VM server 240-1, landline VM server 240-2, landline retrieval server 250-2, wireless retrieval server 250-1 and network 270 are illustrated in FIG. 2 for simplicity. In practice, there may be more or fewer user devices 210, aggregation servers 220, wireless notification servers 230-1, landline notification servers 230-2, wireless VM server 240-1, landline VM server 240-2, landline retrieval servers 250-2, wireless retrieval servers 250-1 and/or networks 270. Also, in some implementations, one or more of the devices of network 200 may perform one or more functions described as being performed by another one or more of the devices of network 200. For example, aggregation server 220, wireless notification server 230-1, landline notification server 230-2, landline retrieval server 250-2 and/or wireless retrieval server 250-1 could be integrated into a single device that performs all or some of the functions described below as being performed by an individual one of these devices.

User device 210 may include any computation or communication device, such as a communication device that is capable of communicating with aggregation server 220 via network 270. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a set-top box (STB), a television, a personal gaming system, or another type of computation or communication device. In one implementation, user device 210 may enable a user to provision and utilize a VVM application and may receive a notification when new voicemail arrives. For example, if user device 210 is a web-based device, user device 210 (e.g., via a web browser) may permit a user to view, listen to, and/or manage voicemail through a hypertext transfer protocol over secure socket layer (HTTPS) on the Internet. If user device 210 is a cell phone, user device 210 may implement a Java-based VVM application that may permit the user to view, listen to, and/or manage voicemail.

The description to follow will generally refer to user device 110 as a wireless communication device. The description is not limited, however, to a wireless communication device and may equally apply to other types of user devices.

Aggregation server 220 may include one or more server devices, or other types of computation or communication devices, that gather, process, search, store, and/or provide information in a manner similar to that described herein. Aggregation server 220 may interface with user device 210 and may interface with backend servers, such as VM servers 240. Aggregation server 220 may also interface with other VVM servers, such as wireless notification server 230-1, landline notification server 230-2, landline retrieval server 250-2 and/or wireless retrieval server 250-1. Aggregation server 220 may respond to voicemail notifications and provide voicemail lists and/or voicemail audio to user device 210. Aggregation server 220 may format requests from user device 210 into a protocol that the backend VM servers 240 may understand, and may aggregate and/or combine data from different voicemail systems (e.g., provided by VM servers 240), and present to user device 210. Aggregation server 220 may enable user device 210 to set up VVM and/or provide updates to a VVM set up profile associated with user device 210. Aggregation server 220 may retrieve VVM set up or other information associated with user device 210 from a wireless VVM database (not shown) and may temporarily store (e.g., cache) certain content for reuse during a voicemail session for server and performance optimization and/or user device 210 authentication. Aggregation server 220 may authenticate user device 210 prior to enabling access to voicemail boxes contained in VM servers 240.

Aggregation server 220 may also receive and/or send voicemail with text transcriptions. For example, aggregation server 220 may direct wireless retrieval server 250-1 and/or landline retrieval server 250-2 to send emails with text transcriptions of the voicemail audio via email/multi-media messaging service (MMS), where a voicemail audio file may be sent as an attachment to the email/MMS while the text transcription may be sent as the body text of the email/MMS.

Wireless notification server 230-1 may include one or more server devices, or other types of computation or communication devices, that provide wireless voicemail notifications (e.g., voicemail notifications associated with a wireless device) to aggregation server 220 and/or user device 210. In one implementation, wireless notification server 230-1 may take the form of a notification server. Wireless notification server 230-1 may receive, from wireless VM server 240-1, a new wireless voicemail notification that includes information associated with user device 210. Wireless notification server 230-1 may retrieve a notification table from a wireless database and may determine whether to send a notification message to aggregation server 220 and/or user device 210. Wireless notification server 230-1 may provide a wireless notification communication to user device 210 and/or aggregation sever 220 to enable the retrieval of wireless voicemail header information associated with user device 210 from a particular voicemail box contained within wireless VM server 240-1 and to alert user device 210 of the presence of voicemail.

Landline notification server 230-2 may include one or more server devices, or other types of computation or communication devices, that provide landline voicemail notifications (e.g., voicemail notifications associated with a landline device) to aggregation server 220 and/or user device 210. In one implementation, landline notification server 230-2 may take the form of a notification server. Landline notification server 230-2 may receive, from landline VM server 240-2, a new landline voicemail notification associated with a landline device (e.g., a landline device associated with user device 210). Landline notification server 230-2 may retrieve a notification table from a landline database and may determine whether to send a notification message to aggregation server 220 and/or user device 210. Landline notification server 230-2 may provide a landline notification communication, landline voicemail header information, landline voicemail audio files and/or other voicemail information associated with the landline device, to user device 210 and/or aggregation sever 220 from a particular voicemail box contained within landline VM server 240-2.

Wireless VM server 240-1 and/or landline VM server 240-2 may include one or more server devices, or other types of computation or communication devices, that store and/or process voicemail. VM servers 240 may provide voicemail boxes for home, office, and/or wireless devices, and may provide a service-wide directory for voicemail box location lookup. The service-wide directory may include telephone numbers, locations of voicemail boxes, and/or other information associated with home, office, or wireless devices that may be accessed by a VVM system. For example, landline VM server 240-2 may provide voicemail boxes for landline devices (e.g., home and/or office telephones) associated with user device 210. Landline VM server 240-2 may store voicemail information associated with a user of landline devices in memory, send or receive voicemail notifications, retrieve voicemail information and manage voicemail when directed by landline notification server 230-2 and/or landline retrieval server 250-2. In another example, wireless VM server 240-1 may provide voicemail boxes for wireless devices (e.g., user device 210 or other wireless devices) associated with a user of user device 210. Wireless VM server 240 may store voicemail information associated with wireless devices in memory, send or receive voicemail notifications, retrieve voicemail information and manage voicemail when directed by wireless notification server 230-1 and/or wireless retrieval server 250-1.

Landline retrieval server 250-2 may include one or more server devices, or other types of computation or communication devices, that gather, process, store, and/or provide information in a manner similar to that described herein. Landline retrieval server 250-2 may interface with aggregation server 220 and/or landline VM server 240-2. Landline retrieval server 250-2, at the direction of aggregation server 220, may generate, manage and/or store a notification table based on set up information associated with user device 210. Moreover, landline retrieval server 250-2 may authenticate user device 210 to backend landline VM server 240-2, when directed by aggregation server 220, to enable voicemail information to be pre-fetched for use by user device 210.

Wireless retrieval server 250-1 may include one or more server devices, or other types of computation or communication devices, that gather, process, store, and/or provide information in a manner similar to that described herein. Wireless retrieval server 250-1 may act as an interface between aggregation server 220 and wireless VM server 240-1. For example, wireless retrieval server 250-1 may receive instructions or information from aggregation server 220 and may provide instructions or information to wireless VM server 240-1 and/or receive instructions or information from wireless VM server 240-1 and provide instructions or information to aggregation server 220.

Network 270 may include a local area network (LAN), a wide area network (WAN), a metropolitan area network (MAN), a telephone network (e.g., the Public Switched Telephone Network (PSTN), or a cellular network, such as the Public Land Mobile Network (PLMN)), an intranet, the Internet, a fiber optic-based network, or a combination of networks.

Although not shown in FIG. 2, network 200 may include a variety of other devices, such as a wireless VVM database, a self-provisioning server, a transcoding server, an authentication server, etc. Each of these devices may perform certain functions described briefly below. Any of these functions may be performed by aggregation server 220. Thus, one or more of these devices may be integrated into aggregation server 220.

Wireless VVM database may include a device that stores a VVM application, VVM set up information associated with user device 210, notification tables, aggregated message tables, voicemail metadata and/or voicemail information, etc. for retrieval by aggregation server 220. The wireless VVM database may be directed by aggregation server 220 to temporarily store information associated with user device 210 (e.g. the user's personal identification number (PIN), mobile directory number (MDN), landline directory number (LDN) of a landline device associated with user device 210, username, password, device version and/or type, etc.) and/or voicemail identifier information (e.g., voicemail mailbox ID (MBID), voicemail message identifiers (MID), caller device number (DN), called DN, state (e.g., saved, new, etc.), time and/or date of call, etc.). The wireless VVM database may temporarily and/or non-persistently store authentication information (e.g., a session cookie and/or information associated with user device 210), such that the information may be cached for the duration of a voicemail session and/or for a predetermined period of time (e.g., 45 minutes). Voicemail metadata, as defined herein, may include any information relating to and/or associated with a voicemail. At the conclusion of a voicemail session, or upon the expiration of the predetermined period of time, the wireless VVM database may purge, erase and/or otherwise expunge the cached information. Additionally, the wireless VVM database could be combined with aggregation server 220 into a single device.

The self-provisioning server may enable a new VVM user to download and set up the VVM application on user device 210. The authentication server, the transcoding server, etc., may be directed by aggregation server 220 to convert content (e.g., voicemail lists, voicemail metadata, voicemail audio files, etc.) into a format that may be readable by user device 210. In one implementation, the transcoding server may transcode an audio file into a format (e.g., WAV, MP3, QCP, etc.) that may be received by aggregation server 220 and aggregated, formatted and/or combined and provided to user device 210.

The authentication server may authenticate user device 210 before allowing access to voicemail information. For example, authentication server may verify information regarding the user, or user device 210, such as a PIN, username and/or password.

FIG. 3 is an exemplary diagram of device 300 that may correspond to aggregation server 220, wireless notification server 230-1, landline notification server 230-2, VM servers 240, landline retrieval server 250-2, and/or wireless retrieval server 250-1. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include a processor, a microprocessor, an application-specific integrated circuit (ASIC), a field programmable gate array (FPGA), or another type of processing unit that may interpret and execute instructions. Main memory 330 may include a random access memory (RAM) or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive or a type of flash memory.

Input device 360 may include a mechanism that permits an operator to input information into device 300, such as a keyboard, a mouse, a pen, a button, voice recognition and/or biometric mechanisms, a touch screen, etc. Output device 370 may include a mechanism that outputs information to the operator, including a display, a speaker, etc. Communication interface 380 may include any transceiver-like mechanism that enables device 300 to communicate with other devices and/or systems. For example, communication interface 380 may include mechanisms for communicating with another device or system via a network, such as network 270.

As described herein, device 300 may perform certain operations in response to processing unit 320 executing software instructions contained in a computer-readable medium, such as main memory 330. A computer-readable medium may be defined as a physical or logical memory device. A logical memory device may include a space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, additional, different, or differently arranged components than depicted in FIG. 3. In still other implementations, one or more components of device 300 may perform one or more tasks described as being performed by one or more other components of device 300.

FIG. 4 is a diagram of an exemplary user device 210. As shown in FIG. 4, user device 210 may include a housing 400, a speaker 410, a display 420, control buttons 430, a keypad 440, a microphone 450, and/or a camera 460. Housing 400 may include a chassis on which some or all of the components of user device 210 are mechanically secured and/or covered. Speaker 410 may include a component to receive input electrical signals from user device 210 and transmit audio output signals which communicate audible information to a user of user device 210.

Display 420 may include a component to receive input electrical signals and present a visual output in the form of text, images, videos and/or combinations of text, images, and/or videos which communicate visual information to the user of user device 210. In one implementation, display 420 may display text input into user device 210, text, images, and/or video received from another device, and/or information regarding incoming or outgoing calls or text messages, emails, media, games, phone books, address books, the current time, etc.

Control buttons 430 may include one or more buttons that accept, as input, mechanical pressure from the user (e.g., the user presses a control button or combinations of control buttons) and may send electrical signals to processing unit 320 that may cause user device 210 to perform one or more operations. For example, control buttons 430 may be used to cause user device 210 to transmit information. Keypad 440 may include a standard telephone keypad or another arrangement of keys.

Microphone 450 may include a component to receive audible information from the user and send, as output, an electrical signal that may be stored by user device 210, transmitted to another user device, or cause the device to perform one or more operations. Camera 460 may be provided on a back side of user device 210, and may include a component to receive, as input, analog optical signals (e.g., a visual scene, visage, event, etc.) and send, as output, a digital image or video that can be, for example, viewed on the display 410, stored in the memory of user device 210, discarded and/or transmitted to another user device 210.

Although FIG. 4 depicts exemplary components of user device 210, in other implementations, user device 210 may contain fewer, additional, different, or differently arranged components than illustrated in FIG. 4. In still other implementations, one or more components of user device 210 may perform one or more tasks described as being performed by one or more other components of user device 210.

FIG. 5 is a diagram of exemplary components of user device 210. As shown in FIG. 5, user device 210 may include a processing unit 500, a memory 510, a user interface 520, a communication interface 530, and/or an antenna assembly 540.

Processing unit 500 may include a processor, a microprocessor, an ASIC, a FPGA, or the like. Processing unit 500 may control operation of user device 210 and its components. In one implementation, processing unit 500 may control operation of components of user device 210 in a manner similar to that described herein. Memory 510 may include a RAM, a ROM, and/or another type of memory to store data and/or instructions that may be used by processing unit 500.

User interface 520 may include mechanisms for inputting information to user device 210 and/or for outputting information from user device 210. Examples of input and output mechanisms might include buttons (e.g., control buttons 430, keys of keypad 440, a joystick, etc.); a touch screen interface to permit data and control commands to be input into user device 210; a speaker (e.g., speaker 410) to receive electrical signals and output audio signals; a microphone (e.g., microphone 450) to receive audio signals and output electrical signals; a display (e.g., display 420) to output visual information (e.g., VVM information); a vibrator to cause user device 210 to vibrate; and/or a camera (e.g., camera 460) to receive video and/or images.

Communication interface 530 may include, for example, a transmitter that may convert baseband signals from processing unit 500 to radio frequency (RF) signals and/or a receiver that may convert RF signals to baseband signals. Alternatively, communication interface 530 may include a transceiver to perform functions of both a transmitter and a receiver. Communication interface 530 may connect to antenna assembly 540 for transmission and/or reception of the RF signals.

Antenna assembly 540 may include one or more antennas to transmit and/or receive RF signals over the air. Antenna assembly 540 may, for example, receive RF signals from communication interface 530 and transmit them over the air, and receive RF signals over the air and provide them to communication interface 530. In one implementation, for example, communication interface 530 may communicate with a network and/or devices connected to a network (e.g., network 270).

As described in detail below, user device 210 may perform certain operations described herein in response to processing unit 500 executing software instructions of an application contained in a computer-readable medium, such as memory 510. The software instructions may be read into memory 510 from another computer-readable medium or from another device via communication interface 530. The software instructions contained in memory 510 may cause processing unit 500 to perform processes that will be described later. Alternatively, hardwired circuitry may be used in place of or in combination with software instructions to implement processes described herein. Thus, implementations described herein are not limited to any specific combination of hardware circuitry and software.

Although FIG. 5 shows exemplary components of user device 210, in other implementations, user device 210 may contain fewer, additional, different, or differently arranged components than depicted in FIG. 5. In still other implementations, one or more components of user device 210 may perform one or more tasks described as being performed by one or more other components of user device 210.

Figure 6A:
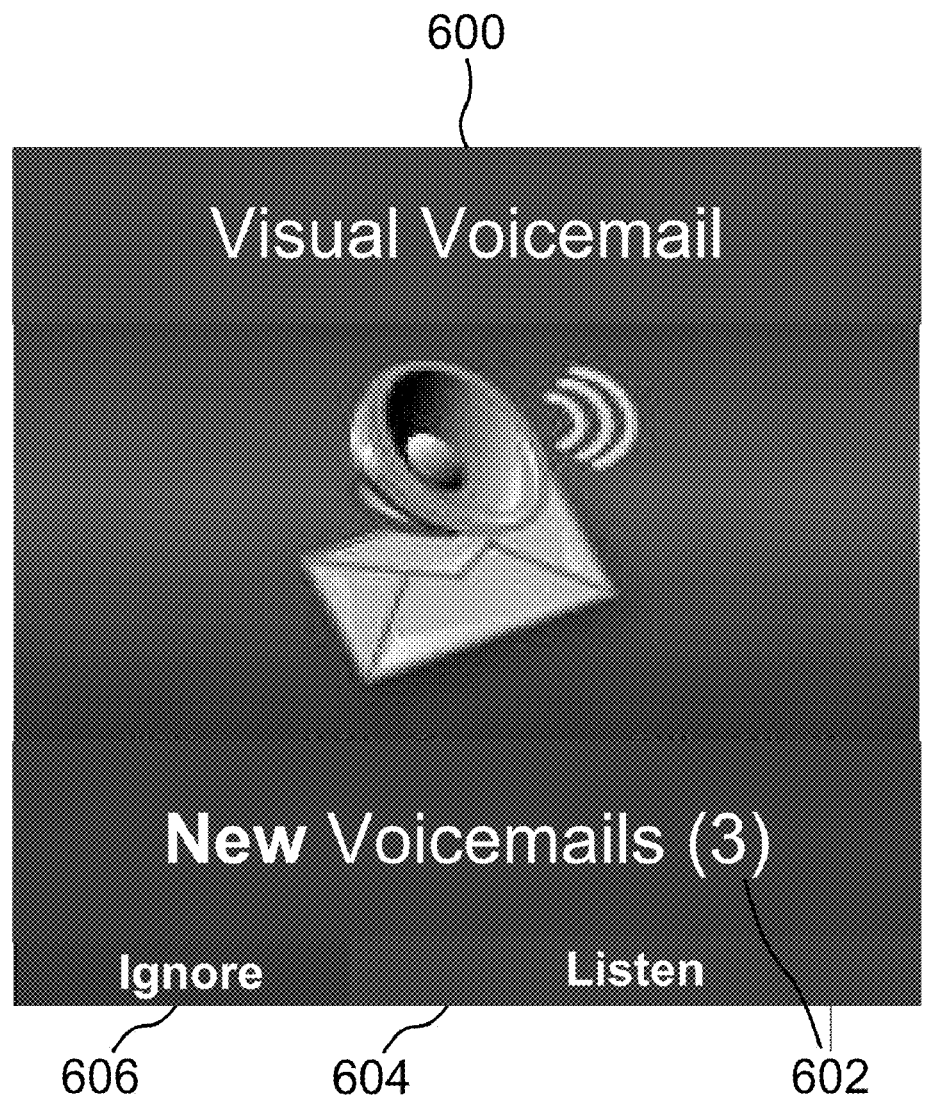
FIGS. 6A-6C are diagrams of exemplary user interfaces capable of being presented on the user device in FIG. 2.
Figure 6B:
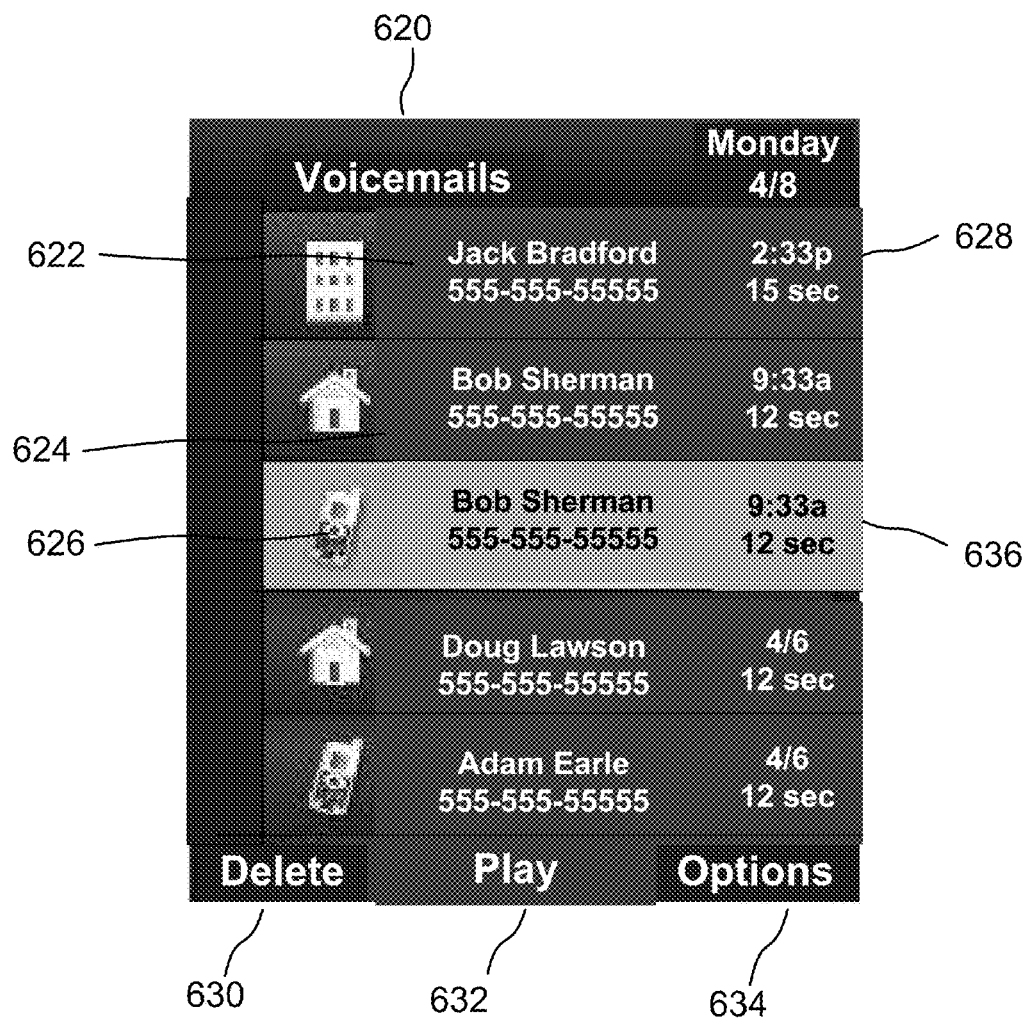
Figure 6C:
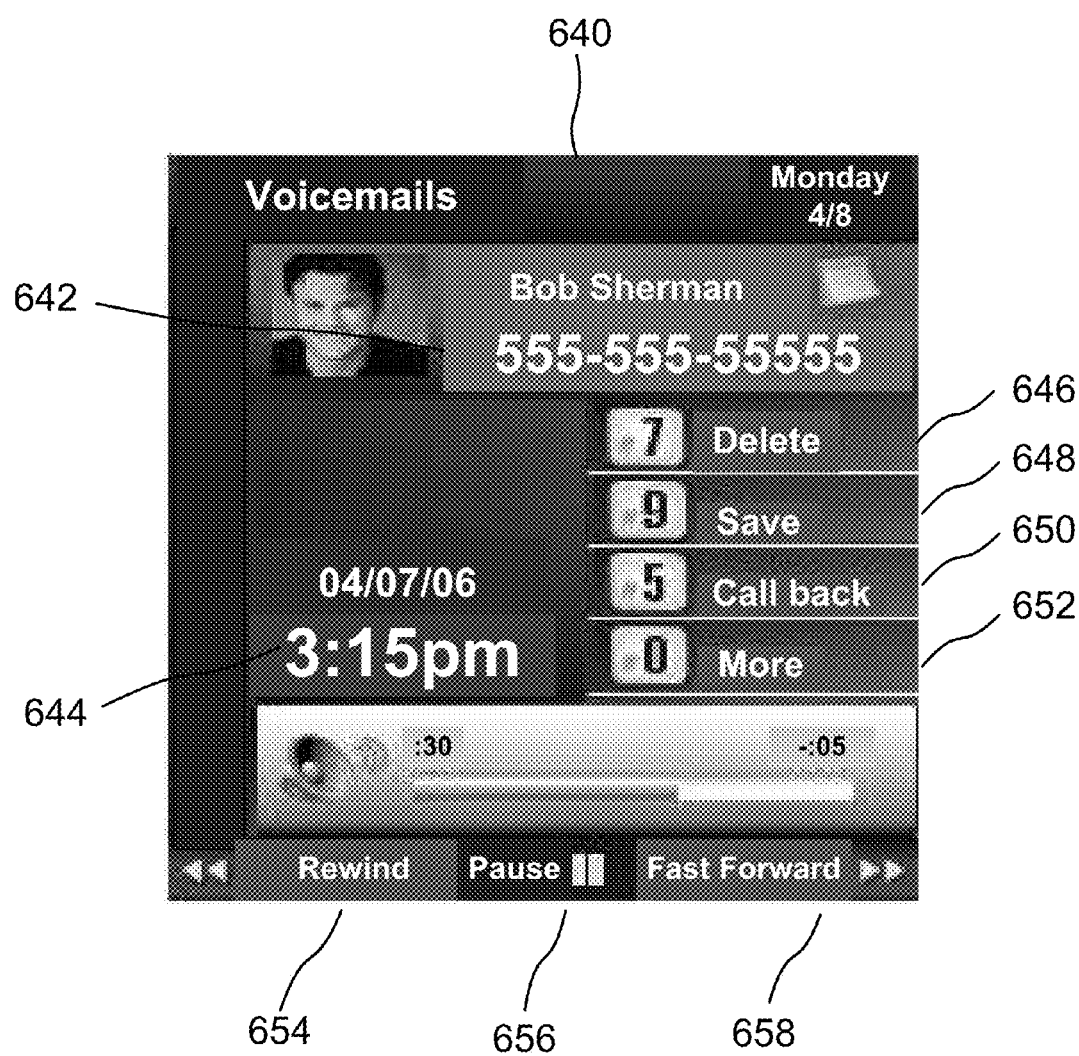

FIGS. 6A-6C are diagrams of exemplary VVM user interfaces capable of being presented on user device 210 in FIG. 2. VVM user interfaces depicted in FIGS. 6A-6C (collectively referred to as the "user interfaces"), may include a component to provide graphical user interfaces (GUIs) or non-graphical user interfaces. The user interfaces may provide information to users via customized interfaces (e.g., proprietary interfaces) and/or other types of interfaces (e.g., browser-based interfaces, television interfaces, etc.). The user interfaces may receive user inputs via one or more input devices (e.g., input device 360), and/or may be user-configurable (e.g., a user may change the size of the user interfaces, information displayed in the user interfaces, color schemes used by the user interfaces, positions of text, images, icons, windows, etc., in the user interfaces, etc.). The user interfaces may be displayed to a user via one or more output devices (e.g., display 420).

As illustrated in FIG. 6A, a user interface 600 and user interface data elements (hereinafter, referred to as "data elements") 602-606 may provide a voicemail notification if a voicemail is received by user device 210. User interface 600 may include an object 602 that identifies the number of voicemails available to user device 210 (e.g., as shown in FIG. 6A, user interface 600 may indicate that three voicemails have been received). The user (e.g., the user of user device 210) may listen to the voicemails (e.g., by selecting a "Listen" button 604), or may ignore the voicemails (e.g., by selecting an "Ignore" button 606).

In one example, if the user of user device 210 selects the "Listen" button 604, a user interface 620 (FIG. 6B) may be presented by user device 210. User interface 620 and data elements 622-636 may provide a list of voicemail identifier information and associated information (e.g., a name of the caller that left the voicemail 622 (hereinafter referred to as, "caller"), a telephone number of the caller 624, an icon indicating a device associated with the user 626 (e.g., user's home, office and/or wireless device, etc.), a time of receipt of the voicemail and/or a duration associated with the voicemail 628, etc.). In one exemplary implementation, user interface 620 may provide the list of voicemail with the most recent (or most urgent) voicemail displayed at the top of the list.

The user (e.g., the user of user device 210) may interact with user interface 620. For example, the user may scroll up or down the list of voicemail, may select one or more voicemail to listen to, may call back a caller, may delete a voicemail, may save a voicemail, may reorder the list, may flag a particular item in the list, etc. The user may also reply to a voicemail by sending a SMS message, an email, or a recorded message from user device 210 to the caller. In one example, the user may delete a voicemail (e.g., by selecting a "Delete" button 630), may listen to a voicemail (e.g., by selecting a "Play" button 632), and/or may access other options (e.g., by selecting an "Options" button 634). If the user selects the "Options" button 634, user device 210 may provide the user with a variety of voicemail management options (e.g., a call back option, a save option, a reply option, a forward option, a compose option, etc.).

In another example, if the user (e.g., the user of user device 210) selects (e.g., highlights) one of the voicemails 636 (e.g., the voicemail from "Bob Sherman") and selects the "Play" button 632, a user interface 640 and data elements 642-658 (FIG. 6C) may by displayed by user device 210. User interface 640 may include a name, an image and/or a telephone number (e.g., "555-555-5555") 642 associated with the caller (e.g., "Bob Sherman). User interface 640 may also include a time and/or date (e.g., "Apr. 7, 2006" at "3:15 PM") 644 associated with the voicemail, an option to delete the voicemail 646 (e.g., "7—Delete"), an option to save the voicemail 648 (e.g., "9—Save"), an option to call the caller 650 (e.g., "5—Call back") and an option to view additional features and/or functions 652 (e.g., "0—More"). The user may rewind the voicemail (e.g., by selecting a "Rewind" button 654), may pause the voicemail (e.g., by selecting a "Pause" button 656), and/or may fast forward the voicemail (e.g., by selecting a "FF" button 658).

Although user interfaces 600-640 and data elements 602-658 depict a variety of information, in other implementations, user interfaces 600-640 and data elements 602-658 may depict less, additional, different, or differently arranged information than depicted in FIGS. 6A-6C. Furthermore, although certain features associated with the VVM application have been described above in connection with FIGS. 6A-6C, in other implementations, the VVM user interfaces may include additional or different features than described above in connection with FIGS. 6A-6C.

FIG. 7 is a flow chart of an exemplary process 700 for setting up multi-number VVM for a user device within network 200 (FIG. 2). In one implementation, some or all of process 700 may be performed by aggregation server 220 interfacing with user device 210, wireless notification server 230-1, landline notification server 230-2, VM servers 240, landline retrieval server 250-2 and/or wireless retrieval server 250-1. In another implementation, some or all of process 700 may be performed by one or more devices separate from or in combination with aggregation server 220. FIG. 8 is an exemplary multi-number VVM set-up operation 800 capable of being performed by an exemplary portion of network 200. Process 700 will be discussed below with corresponding references to operation indicators of VVM set up operation 800 of FIG. 8.

Process 700 of FIG. 7 may include receiving a request to set up VVM from user device 210 (block 705). For example, aggregation server 220 may receive, as indication 810, a request to set up VVM from user device 210. The request may include information associated with user device 210 (e.g., MDN, PIN, username, password, device version and/or type, etc.) and/or a session cookie.

User device 210 may be authenticated before setting up VVM (block 710). For example, as shown in FIG. 8, aggregation server 220 may receive a VVM set up request, as indication 810, and may determine whether the session cookie received from user device 210 is valid (e.g., the session cookie was included in the request, has not expired and/or is otherwise acceptable). If aggregation server 220 validates the session cookie then aggregation server 220 may authorize user device 210 to set up VVM. If, however, aggregation server 220 determines that the session cookie is invalid (e.g., the session cookie was not included in the request, has expired and/or is otherwise unacceptable), aggregation server 220 may compare received information associated with user device 210 (e.g., MDN, PIN, username, password, device version and/or type, etc.) to information associated with user device 210 stored in a wireless VVM database. If aggregation server 220 determines that the received information associated with user device 210 does not match the information associated with user device 210 stored in the wireless VVM database, then process 700 may end and aggregation server 220 may not authorize user device 210 to set up VVM.

If, however, aggregation server 220 determines that the received information associated with user device 210 matches the information associated with user device 210 stored in the wireless VVM database, then aggregation server 220 may authenticate user device 210 and may generate a new session cookie and store the session cookie in the wireless VVM database (e.g., if one is not already stored in the wireless VVM database).

VVM set up information associated with user device 210 may be obtained (block 715). For example, as shown in FIG. 8, aggregation server 220 may prompt user device 210 for VVM set up information, by indication 820, and user device 210 may send VVM set up information to aggregation server 220 as indication 830. Aggregation server 220 may receive indication 830, which may include information associated with wireless and/or landline devices for which the user (e.g., a user of user device 210) wishes to receive voicemails via user device 210 (e.g., wireless and/or landline telephone numbers, corresponding PINs, usernames, passwords, device versions and/or types, etc.). For example, VVM set up information may include information associated with a user's home telephone number (e.g., a landline device number (LDN), PIN, username and/or password, device versions and/or types, etc.); information associated with the user's office telephone number (e.g., LDN, PIN, username and/or password, device versions and/or types, etc.); and/or information associated with the user's wireless and/or landline devices (e.g., MDN and/or LDN, PINs, usernames and/or passwords, device versions and/or types, etc.).

VVM set up information may be exchanged and VVM set up may be confirmed (block 720). For example, as shown in FIG. 8, aggregation server 220 may send VVM set up information, as indication 830, for each landline and/or wireless device provided by the user (e.g., MDNs, LDNs, PINs, usernames and/or passwords, device versions and/or types etc.) to landline retrieval server 250-2 and/or wireless retrieval server 250-1. Alternatively, or in addition, aggregation server 220 may send VVM set up information associated with a wireless device (e.g., MDN, PIN, username and/or password, device version and/or type, etc.) to wireless retrieval server 250-1; VVM set up information associated with a landline device (e.g., LDN, PIN, username and/or password, device version and/or type, etc.) to landline retrieval server 250-2; and/or store VVM set up information for each landline and/or wireless device in the wireless VVM database.

As shown in FIG. 8, wireless retrieval server 250-1 may receive VVM set up information from aggregation server 220, as indication 830, and may send information associated with a wireless device (e.g., MDN, PIN, username, and/or password, etc.), as indication 840, to wireless VM server 240-1. Similarly, landline retrieval server 250-2 may receive VVM set up information from aggregation server 220, as indication 830, and may send information associated with a landline device, as indication 840, to landline VM server 240-2.

Wireless VM server 240-1 may receive indication 840 and may compare information associated with the wireless device with the information associated with the wireless device stored in wireless VM server 240-1 memory. If wireless VM server 240-1 determines that the received information associated with wireless device matches the information associated with wireless device stored in wireless VM server 240-1 memory, then wireless VM server 240-1 may send a notification, as indication 850, validating wireless device to wireless retrieval server 250-1; otherwise, wireless VM server 240-1 may send a notification, as indication 850, invalidating the wireless device to wireless retrieval server 250-1. Wireless retrieval server 250-1 may receive indication 850 and may send a notification of a valid or invalid wireless device, as indication 850, to aggregation server 220. Aggregation server 220 may receive indication 850 of an invalid wireless device and may respond by sending a notification of invalid VVM set up information, as indication 860, to user device 210. Furthermore, aggregation server 220 may update VVM set up information in the wireless VVM database associate with a wireless device in accordance with indication 850.

Furthermore, landline VM server 240-2 may receive indication 840 and may determine whether the information associated with the landline device is valid or invalid. Landline VM server 240-2 may send a notification, as indication 850, validating landline device to landline notification server 230-2; otherwise, landline VM server 240-2 may send a notification, as indication 850, invalidating landline device to landline notification server 230-2. Landline notification server 230-2 may receive indication 850 and may send a notification of a valid or invalid landline device, as indication 850, to aggregation server 220. Aggregation server 220 may receive indication 850 of an invalid landline device and may respond by sending a notification of invalid set up information, as indication 860, to user device 210. Furthermore, aggregation server 220 may update, in the wireless VVM database, VVM set up information associated with a landline device in accordance with indication 850.

A notification table may be generated and stored in wireless VVM database and/or landline retrieval server 250-2 memory (block 725). For example, as shown in FIG. 8, aggregation server 220 may receive a notification of a valid wireless and/or landline device as indication 850 and may aggregate the valid wireless and/or landline VVM set up information to generate a notification table that associates user device 210 to the voicemail boxes of the user's (e.g., the user of user device 210) wireless and/or landline devices. Aggregation server 220 may store the notification table information in the wireless VVM database and/or, as shown in FIG. 8, may send all or a portion of the notification table information, as indication 870, to landline retrieval server 250-2.

Landline retrieval server 250 may receive indication 870 and may store the notification table in memory (i.e., memory associated with landline retrieval server 250-2) and/or may send the notification table information, as indication 870, to landline VM server 240-2. Landline VM server 240-2 may receive indication 870 and may send the notification table information, as indication 870, to landline notification server 230-2. Landline notification server 230-2 may receive indication 870 and may store the notification table information in memory. In another implementation, landline retrieval server 250-2 may send the notification table information directly to landline notification server 230-2.

Figure 9B:
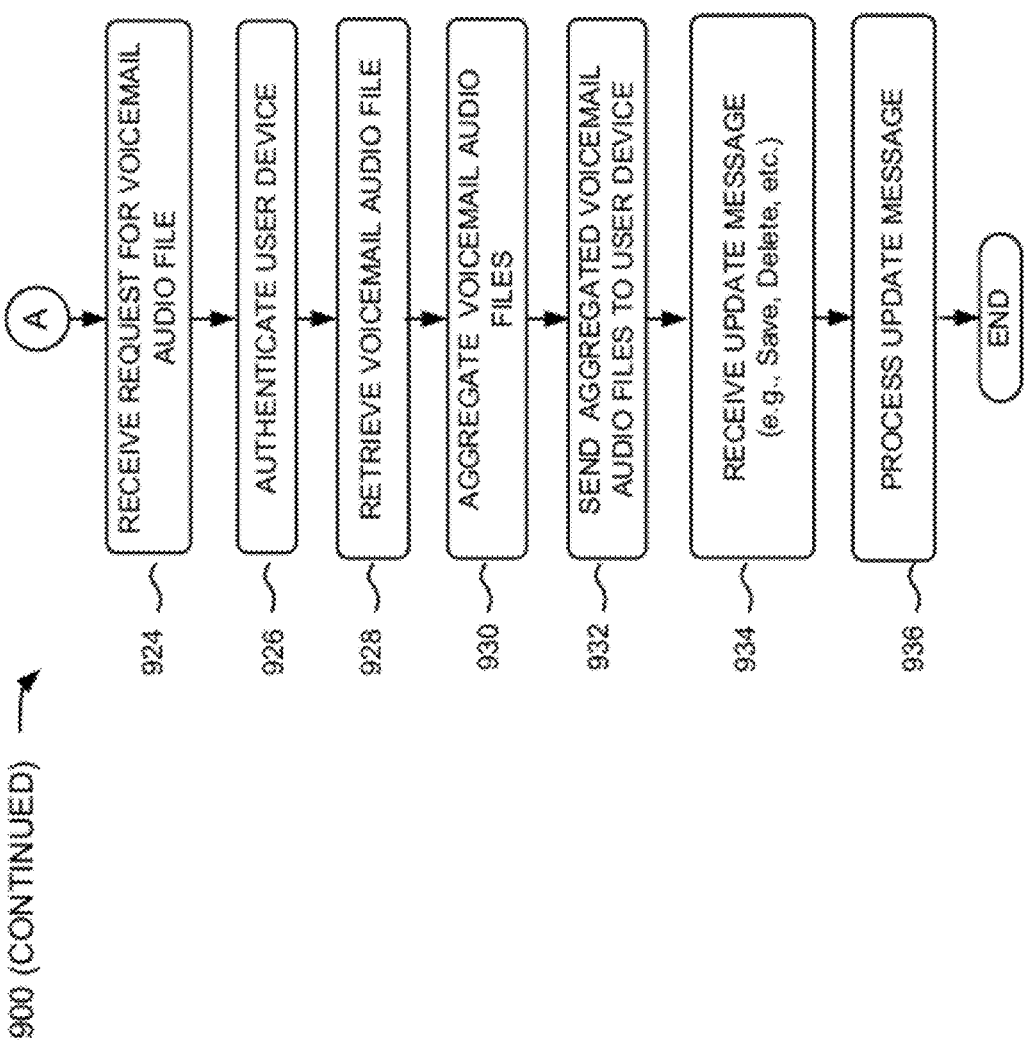

FIGS. 9A and 9B are flow charts of an exemplary process 900 for interacting with a multi-number VVM system within an exemplary portion of network 200. In one implementation, some or all of process 900 may be performed by aggregation server 220 interfacing with user device 210, wireless notification server 230-1, landline notification server 230-2, VM servers 240, landline retrieval server 250-2 and/or wireless retrieval server 250-1. In another implementation, some or all of process 900 may be performed by one or more devices separate from, or in combination with, aggregation server 220. FIG. 10 is an exemplary multi-number VVM operation 1000 capable of being performed by an exemplary portion of network 200. A portion of process 900 of FIGS. 9A and 9B will be discussed below with corresponding references to operation indicators of the multi-number VVM operation 1000 of FIG. 10.

Process 900 of FIG. 9 may include receiving a voicemail notification (block 902). For example, assume that a voicemail associated with a user's (e.g., a user associated with user device 210) landline and/or wireless device (e.g., home and/or office landline telephones and/or wireless devices associated with user device 210) is received. For voicemail associated with the user's wireless device, wireless VM server 240-1 may send a wireless voicemail notification, as indication 1005 (FIG. 10), to wireless notification server 230-1. Voicemail notification 1005 may include information associated with one or more wireless devices and voicemail location information (e.g., MBID), which corresponds to one or more voicemail storage locations for each voicemail within the memory of wireless VM server 240-1. Wireless notification server 230-1 may receive indication 1005 and may retrieve notification table information from the wireless VVM database to determine whether a voicemail notification should be sent to user device 210. If the notification table information indicates that a wireless voicemail notification should be sent to user device 210, then wireless notification server 230-1 may send a wireless voicemail notification to aggregation server 220, as indication 1005.

Similarly, for voicemail associated with the user's landline device, landline VM server 240-2 may send a landline voicemail notification, as indication 1010 (FIG. 10), to landline notification server 230-2. Voicemail notification 1010 may include information associated with one or more landline devices and voicemail location information (e.g., MBID), which corresponds to one or more voicemail storage locations for each voicemail within the memory of landline VM server 240-2. Landline notification server 230-2 may receive indication 1010 and may retrieve notification table information from the wireless VVM database to determine whether a notification should be sent a wireless device (e.g., user device 210). If the notification table information indicates that a wireless device (e.g., user device 110) shall receive a notification for voicemail associated with a landline device (e.g., LDN), then landline notification server 230-2 may send a landline notification to aggregation server 220, as indication 1015.

If the voicemail notification is a landline notification (block 904-YES), landline voicemail header information may be pre-fetched (block 906). For example, aggregation server 220 may receive indication 1005 and/or 1015, from wireless notification server 230-1 and/or landline notification server 230-2, respectively. Aggregation server 220 may distinguish a landline notification from a wireless notification by checking the post script portion of the received notification message for the presence of an "L" indicator, signifying a landline notification. If aggregation server 220 determines that the notification is a landline notification, aggregation server 220 may send indication 1020 directing landline retrieval server 250-2 to pre-fetch the landline voicemail header information from landline VM server 240-2.

Landline retrieval server 250-2 may receive indication 1020 and may direct landline VM server 240-2, via indication 1025, to retrieve the landline voicemail header information. Indication 1025 may include information associated with a landline device (e.g., LDN, PIN, username and/or password, etc.) that is associated with user device 210, and/or the voicemail storage location (e.g., MBID, which corresponds to a storage location within the memory of landline VM server 240-2). Landline VM server 240-2 may receive indication 1025 and may authenticate the landline device by comparing the information associated the landline device with information associated with the landline device stored in landline VM server 240-2 memory. If the information associated with the landline device included in indication 1025 matches the information associated with the landline device stored in landline VM server 240-2 memory, landline VM server 240-2 may authenticate the landline device and may send indication 1030 containing the landline voicemail header information to landline retrieval server 250-2. Indication 1030 may contain information associated the landline device (e.g., LDN), voicemail identifier information (e.g., MID, caller device number (DN), state (e.g., played, new, saved, etc.), voicemail date and/or time, etc.), voicemail location information (e.g., MBID, which is the landline voicemail storage location within the memory of landline VM server 240-2) and/or audio file format (e.g., WAV, MP3, QCP, etc.). Landline retrieval server 250-2 may receive indication 1030 containing the landline voicemail header information and may send indication 1030 to aggregation server 220.

If, however, landline VM server 240-2 does not authenticate the landline device, then landline VM server 240-2 may not send indication 1030 containing landline voicemail header information to landline retrieval server 250-2 and/or aggregation server 220.

If the voicemail notification does not contain a landline voicemail notification (e.g., the notification may be a wireless voicemail notification) (block 904-NO), wireless voicemail information may be pre-fetched (block 908). For example, as shown in FIG. 10, aggregation server 220 may direct wireless retrieval server 250-1, via indication 1020, to pre-fetch the wireless voicemail header information from wireless VM server 240-1.

Wireless retrieval server 250-1 may receive indication 1020 and may direct wireless VM server 240-1, via indication 1025, to retrieve the wireless voicemail header information. Indication 1025 may include information associated with user device 210 (e.g., user device 210 MDN, PIN, username and/or password, etc.) and/or the voicemail storage location (e.g., MBID, which corresponds to a storage location within the memory of VM server 240-1). Wireless VM server 240-1 may receive indication 1025 and may authenticate user device 210 in a manner similar to that described above (block 906). Wireless VM server 240-1 may authenticate user device 210 and may send indication 1035 containing the wireless voicemail header information to wireless retrieval server 250-1. Indication 1035 may contain information associated with user device 210 (e.g., user device 210 MDN), voicemail identifier information (e.g., called MDN, MID, caller DN, state (e.g., played, new, saved, etc.), voicemail date and/or time, etc.), voicemail location information (e.g., MBID, which is a voicemail storage location within the memory of wireless VM server 240-1) and/or audio file format (e.g., WAV, MP3, QCP, etc.). Wireless retrieval server 250-1 may receive indication 1035 containing the wireless voicemail header information and may send indication 1035 to aggregation server 220.

If, however, wireless VM server 240-1 does not authenticate user device 210, then wireless VM server 240-1 may not send indication 1035 containing wireless voicemail header information to wireless retrieval server 250-1 and/or aggregation server 220.

Voicemail header information may be aggregated and stored as an aggregate voicemail message table (block 910). For example, as shown in FIG. 10, aggregation server 220 may receive indication 1030 from landline retrieval server 250-2 containing the landline voicemail header information and may generate a voicemail message table to manage voicemail information associated with a particular landline device (e.g., associated with a particular LDN). Similarly, aggregation server 220 may receive indication 1035 from wireless retrieval server 250-1 containing the wireless voicemail header information and may generate a voicemail message table to manage the voicemail information associated with a particular wireless device (e.g., user device 210 MDN). The particular landline and/or wireless message table may contain data fields for each voicemail including MBID, MID, called DN (e.g., MDN and/or LDN), caller DN, state (e.g., played, saved, new, etc.), date and/or time of voicemail, and/or storage location (e.g., storage location within the wireless VVM database). Aggregation server 220 may temporarily store the voicemail message table, associated with the landline device and/or the wireless device, in the wireless VVM database.

Aggregation server 220 may generate an aggregate message table by combining the voicemail message table associated with the landline device with the voicemail message table associated with the wireless device. The aggregate message table may include the voicemail header information retrieved from wireless VM server 240-1 and landline VM server-240-2 in a single aggregated message table that includes the same data fields as the individual wireless and/or landline message tables. Aggregation server 220 may store the aggregate message table in the wireless VVM database.

An aggregate voicemail notification may be sent to user device 210 (block 912). For example, as shown in FIG. 10, aggregation server 220 may generate an aggregated voicemail notification derived from the aggregated message table stored in the wireless VVM database. From the aggregated message table, the aggregated voicemail notification may include voicemail identifiers, such as the total number of voicemail, number of new voicemail, MBID for each voicemail and/or MID for each voicemail. Aggregation server 220 may combine additional components with the aggregated voicemail notification to enable a VVM user interface (e.g., VVM user interface 600 of FIG. 6A) to be generated.

In one implementation, aggregation server 220 may retrieve, from the wireless VVM database, information to assemble a voicemail notification user interface (e.g., data elements 602-606 of user interface 600 of FIG. 6A) that user device 210 may present. Aggregation server 220 may send indication 1040 containing data elements 602-606 of user interface 600 of FIG. 6A and the aggregated voicemail notification to wireless notification server 230-1. Wireless notification server 230-1 may receive indication 1040 and may send indication 1040 to user device 210. User device 210 may receive indication 1040 and may display a user interface (e.g., user interface 600 of FIG. 6A) enabling the user to view the number of voicemails received (e.g., "Voicemails (3)" 602), to listen to voicemail 604, and/or ignore the voicemail 606. While FIG. 10 shows aggregation server 220 sending indication 1040 to user device 210 via wireless notification server 230-1, in another implementation, aggregation server 220 may send all or some of indication 1040 containing the aggregated voicemail notification and user interface information (e.g. data elements 602-606 of user interface 600 of FIG. 6A) directly to user device 210 or via another server device.

A request for a voicemail list may be received (block 914). If a request for a voicemail list is not received, process 900 may end (block 914-NO); however, if a request for a voicemail list is received (block 914-YES), user device 210 may be authenticated (block 916). For example, as shown in FIG. 10, aggregation server 220 may receive indication 1045 from user device 210 requesting a voicemail list. Indication 1045 may include information associated with user device 210 (e.g., user device 210 MDN, PIN, username, password, and/or device version and/or type, etc.), voicemail identifiers (e.g., MID), voicemail storage location information (e.g., MBID for each voicemail) and/or a session cookie.

In response to indication 1045, aggregation server 220 may determine whether the session cookie received from user device 210 is valid (e.g., the session cookie was included in the request, has not expired and/or is otherwise acceptable). If aggregation server 220 validates the session cookie then aggregation server 220 may send the voicemail list to user device 210. If, however, aggregation server 220 determines that the session cookie is invalid (e.g., the session cookie was not included in the request, has expired and/or is otherwise unacceptable), aggregation server 220 may compare received information associated with user device 210 (e.g., MDN, PIN, username, password, and/or device version and/or type, etc.) to information associated with user device 210 stored in the wireless VVM database. If aggregation server 220 determines that the received information associated with user device 210 does not match the information associated with user device 210 stored in the wireless VVM database, then process 900 may end and aggregation server 220 may not send the voicemail list to user device 210.

If, on the other hand, aggregation server 220 determines that the received information associated with user device 210 matches the information associated with user device 210 stored in the wireless VVM database, then aggregation server 220 may authenticate user device 210 and may generate a new session cookie (e.g., if one is not already stored in the wireless VVM database). Aggregation server 220 may temporarily store the session cookie in the wireless VVM database.

The aggregated voicemail message table may be retrieved, used to generate an aggregated voicemail list, and the aggregated voicemail list may be sent to user device 210 (blocks 918-922). For example, aggregation server 220 may retrieve the aggregated voicemail table from the wireless VVM database. Aggregation server 220 may combine additional components with the aggregated voicemail table to generate a voicemail list user interface (e.g., VVM user interface 620 of FIG. 6B) that may be presented to user device 210. In one implementation, aggregation server 220 may retrieve, from the wireless VVM database, information to assemble a voicemail list user interface (e.g., data elements 622-636 of user interface 620 of FIG. 6B) that user device 210 may present. Aggregation server 220 may send indication 1050 containing data elements 622-636 of user interface 620 of FIG. 6B and/or the aggregated voicemail list to user device 210. Aggregation server 220 may update the aggregated voicemail table and store the updated aggregation table in the wireless VVM database.

User device 210 may receive indication 1050 and may display a voicemail list user interface (e.g., user interface 620 of FIG. 6B) enabling the user (e.g., user of user device 210) to view the name of the caller 622, telephone number of caller 624, type of device called 626 (e.g., landline home, office and/or wireless device associated with user device 210), and/or the time and duration of the voicemail 628. User device 210 may also enable the user to highlight the voicemail on the list 636 and manage voicemail by deleting the highlighted voicemail 630, playing the highlighted voicemail 632 and/or viewing other options (e.g., save, reply, forward, call back, call forward, etc.).

A request for a voicemail audio file may be received (block 924). For example, user device 210 may receive indication 1050 containing the aggregated voicemail list and user device 210 may compare the voicemail list to another voicemail list saved in user device 210 memory. User device 210 may determine that voicemail audio files are desired to be retrieved and user device 210 may send, to aggregation server 220, a request to retrieve voicemail audio files. The request, by user device 210, for voicemail audio files may include information associated with user device 210 (e.g., user device 210 MDN, PIN, username, and/or password, etc.), voicemail identifiers (e.g., MID for each voicemail), voicemail storage location information (e.g., MBID indicating storage location within VM server 240 memory), desired audio file format (e.g., WAV, MP3, QCP, etc.) and/or a session cookie.

In another implementation, in a manner similar to that described above (at blocks 908-912) (FIG. 9A), aggregation server 220 may automatically pre-fetch the voicemail audio files from wireless VM server 240-1 and/or landline VM server 240-2, for wireless and/or landline devices associated with user device 210, after the voicemail header information is pre-fetched even though a request for audio files may not be received from user device 210. The retrieved voicemail audio files may be stored, by aggregation server 220, in the wireless VVM database until retrieval is requested by the user device.

User device 210 may be authenticated (block 926). For example, aggregation server 220 may receive a request to retrieve voicemail audio files and may authenticate user device 210 in a manner similar to that described above (at block 916). If aggregation server 220 does not authenticate user device 210, then process 900 may end. If, however, aggregation server 220 authenticates user device 210, then aggregation server 220 may allow user device 210 to retrieve voicemail audio files.

A voicemail audio file may be retrieved (block 928). For example, aggregation server 220 may retrieve a wireless and/or landline voicemail audio file by determining which backend wireless and/or landline VM server 240 contains the voicemail audio file to be retrieved. Aggregation server 220 may determine the corresponding backend VM server 240 by referencing a set-up table, stored in the wireless VVM database, such as that shown in FIG. 11 (e.g., set up table 1100), that associates a user ID, a called DN, called device information and/or a wireless or landline VM server 240. For example, as shown in FIG. 11, the user ID 1102 may store information that uniquely identifies user device 210 or a user of user device 210 such as a PIN, username and/or password of user device 210; the called DN 1104 may store information that identifies the particular landline or wireless device associated with user device 210 or a user of user device 210, such as LDN or MDN associated with home, office or wireless device associated with user device 240); called device information 1106 may store information that uniquely identifies the user of a landline or wireless device that is associated with user device 210 or the user of user device 210, such as PIN, username and/or password, etc.); and/or VM servers 1108 that identifies the particular backend landline VM server 240-2 (e.g., landline VM server 240A or landline VM server 240B) that contains voicemail information corresponding to landline devices (e.g., landline home or landline office telephone) associated with user device 210 or the user of user device 210, or the backend wireless VM server 240-1 (e.g., wireless VM server 240C) that contains voicemail information corresponding to wireless devices associated with user device 210 or the user of user device 210.

In one implementation, aggregation server 220 may receive a request to retrieve a voicemail audio file with a particular called DN (e.g., called DN of 703-567-8989) and may determine, from set up table 1100 of FIG. 11, that the corresponding VM server 240 is wireless VM server 240C from which the audio file may be retrieved. Aggregation server 220 may send a request to wireless retrieval server 250-1 to retrieve the wireless audio file associated with the particular called DN. Wireless retrieval server 250-1 may receive the request for the wireless audio file and may send a request to wireless VM server 240C to retrieve the wireless voicemail audio file associated with the particular called DN. In another implementation, aggregation server 220 may send the request to retrieve the wireless audio file directly to wireless VM server 240C. The request to retrieve the wireless voicemail audio file may include information associated with user device 210 (e.g., user device 210 MDN, PIN, username, and/or password), voicemail identifiers (e.g., MID), voicemail location information (e.g., MBID for each wireless voicemail), and/or desired audio file format (e.g., WAV, MP3, QCP, etc.). Wireless VM server 240C may authenticate user device 210 in a manner similar to that discussed above (at block 908). If wireless VM server 240C does not authenticate user device 210, then process 900 may end. If, however, wireless VM server 240C authenticates user device 210, wireless VM server 240C may send the wireless voicemail audio file to wireless retrieval server 250-1. Wireless retrieval server 250-1 may receive the wireless voicemail audio file and may send the wireless voicemail audio file to aggregation server 220. In another implementation, wireless VM server 240C may send the wireless voicemail audio file directly to aggregation server 220.

In another implementation, aggregation server 220 may receive a request to retrieve a voicemail audio file with a particular called DN (e.g., called DN of 202-251-3434) and may determine, from set up table 1100 of FIG. 11, that the corresponding VM server 240 is landline VM server 240A, from which the audio file may be retrieved. Aggregation server 220 may send a request to landline retrieval server 250-2 to retrieve the landline voicemail audio file. Landline retrieval server 250 may receive the request from aggregation server 220 and may send a request to landline VM server 240A to retrieve the landline voicemail audio file. The request to retrieve the landline voicemail audio file may include information associated with the landline device (e.g., the called LDN, PIN, username, and/or password), voicemail identifiers (e.g., MID), voicemail location information (e.g., MBID for each wireless voicemail), and/or desired audio file format (e.g., WAV, MP3, QCP, etc.). Landline VM server 240A may authenticate user device 210 in a manner similar to that discussed above (at block 906). If landline VM server 240A does not authenticate user device 210, then process 900 may end. If, however, landline VM server 240A authenticates user device 210, landline VM server 240A may send the landline voicemail audio file to landline notification server 230-2. Landline notification server 230-2 may receive the landline audio file from landline VM server 240A and may send the landline voicemail audio file to aggregation server 220.

The voicemail files may be aggregated and sent to user device 210 (blocks 930 and 932). For example, aggregation server 220 may receive a landline and/or wireless voicemail audio file from landline VM server 240A (via landline notification server 230-2) and/or wireless VM server 240C (via wireless retrieval server 250-1), respectively. Aggregation server 220 may aggregate the audio files and may temporarily store them in the wireless VVM database in accordance with the aggregated voicemail message table. Aggregation server 220 may also combine additional components with the aggregated voicemail audio file that enables a user interface (e.g., VVM user interface 640 of FIG. 6C) to be generated. In one implementation, aggregation server 220 may retrieve, from wireless retrieval server 250-1, information to assemble a VVM user interface (e.g., data elements 642-658 of user interface 640 of FIG. 6C) that user device 210 may present. Aggregation server 220 may send, to user device 210, user interface 640 and data elements 642-658 of FIG. 6C with the aggregated voicemail audio file that user device 210 may understand and/or display. Aggregation server 220 may update the aggregated message table and store the updated aggregated message table in the wireless VVM database.

User device 210 may receive the aggregated voicemail audio file and may display a user interface (e.g., user interface 640 of FIG. 6C) enabling the user (e.g., the user of user device 210) to view and manage voicemail during or after playback. The user may view the name, image and/or telephone number of the caller 642 as well as the date and/or time of the voicemail. The user may interact with user interface 640 to manage the playback of the voicemail by selecting "Rewind" 654 to go back to a previous spot in the voicemail, "Pause" 656 to stop playback or "Fast Forward" 658 to go forward to a subsequent spot in the voicemail. The user may further manage the voicemail by selecting "7" to delete the voicemail, "9" to save the voicemail, "5" to call back the caller and/or "0" for additional voicemail management options (e.g., reply, forward, call forward, etc.).

An update message may be received and processed (blocks 934 and 936). For example, aggregation server 220 may receive, from user device 210, an update message reflecting the desire by the user to manage voicemail (e.g., save, delete, reply, etc.). Aggregation server 220 may send the update message to corresponding wireless and/or landline VM server 240, via wireless retrieval server 250-1 and/or landline retrieval server 250-2, respectively, in a manner similar to that described above (at block 928). Landline and/or wireless VM server 240 may receive an update message and may authenticate user landline device and/or user device 210 in a manner described above (at block 906 and/or 908, respectively).

For example, landline VM server 240 (e.g., landline VM server 240A and/or landline VM server 240B as indicated in setup table 1100 in FIG. 11) may update voicemail information stored in memory in accordance with the landline update message request (e.g., save, delete, forward, etc.). Landline VM server 240 may send a landline update status message to landline notification server 230-2. Landline notification server 230-2 may receive the landline update status message and may send a landline update status message to aggregation server 220. Similarly, wireless VM server 240 (e.g., wireless VM server 240C as indicated in set up table 1100 in FIG. 11) may update voicemail information stored in memory in accordance with the wireless update message request (e.g., save, delete, forward, etc.). Wireless VM server 240 may send a wireless update status message to wireless notification server 230-1. Wireless notification server 230-1 may receive the wireless update status message and may send a wireless update status message to aggregation server 220.

Aggregation server 220 may receive a landline and/or wireless update status message. Aggregation server 220 may determine that the status (e.g., saved, played, etc.) for a particular voicemail (e.g., identified by MBID and/or MID) in the received update status message does not match the status of the corresponding voicemail within the aggregated message table stored in the wireless VVM database and may update the status of the voicemail in the aggregated message table to the status indicated in the update status message. Aggregation server 220 may store the updated aggregated message table in the wireless VVM database and may send an update status message to user device 210 (e.g., indicating the success or failure of the update message).

Figure 12:
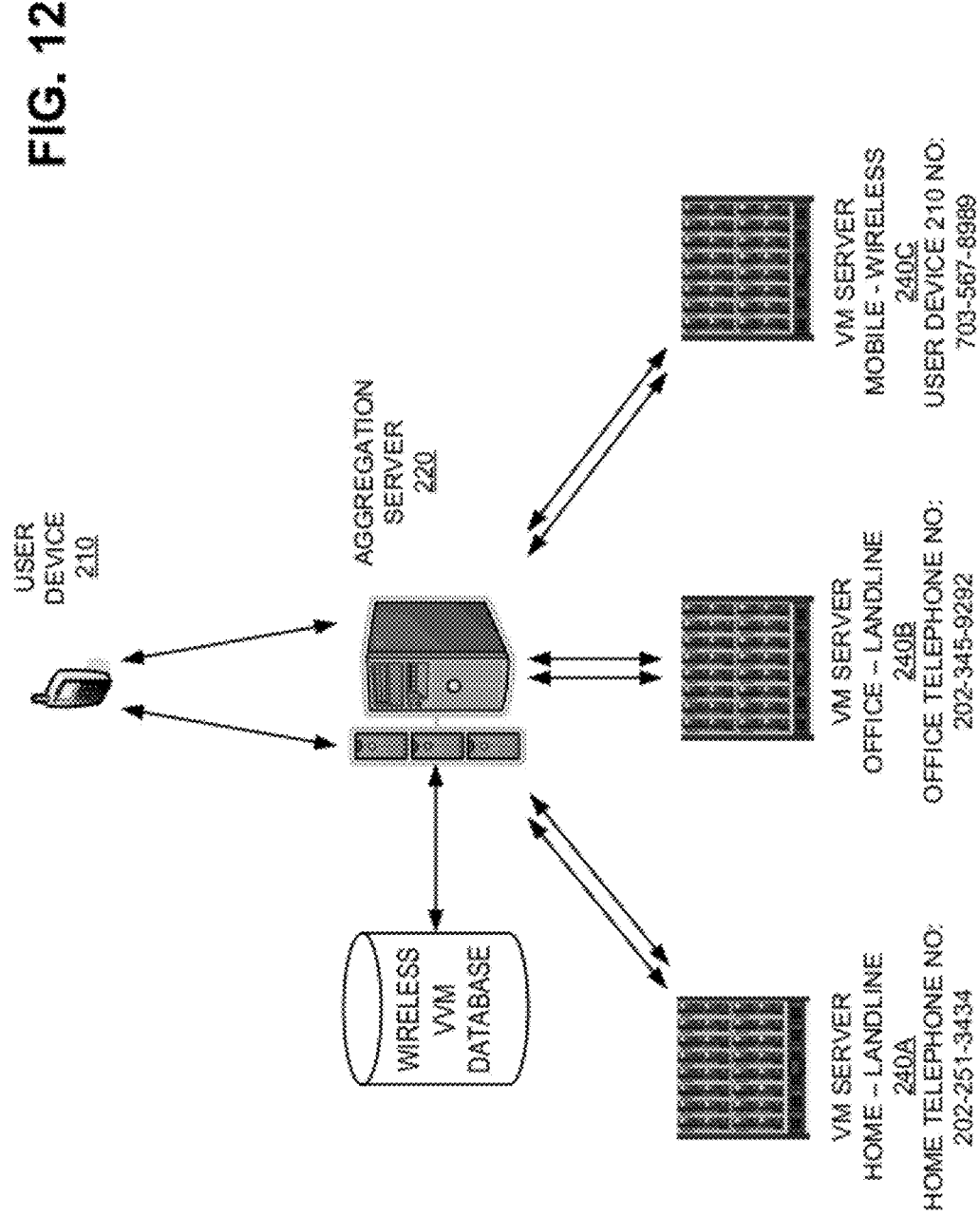
FIG. 12 is a simplified diagram of an exemplary multi-number VVM system of FIG. 2, with an aggregation server interacting with a user device and wireless and landline voicemail servers.

FIG. 12 is a simplified diagram of an exemplary multi-number VVM system of FIG. 2, with aggregation server 220 interacting with user device 210, landline VM server 240A, landline VM server 240B and/or wireless VM server 240C. Aggregation server 220 may interface with user device 210 and may communicate with (e.g., data calls to and/or from) VM server 240A, VM server 240B and/or VM server 240C to retrieve and/or manage voicemail information for user device 210.

As shown in FIG. 12, user device 210 may set up VVM such that user device 210 may retrieve and/or manage voicemail information associated with landline devices (e.g., a home landline telephone and/or an office landline telephone, etc.) and/or wireless devices (e.g., user device 210 and/or other wireless devices) in a manner similar to that described above in process 700 of FIG. 7 and operation 800 of FIG. 8. In one implementation, aggregation server 220 may receive a request, using hypertext transfer protocol (e.g., HTTP), from user device 210 to set up visual voicemail and may authenticate user device 210 in a manner similar to that described above (at block 710 of FIG. 7).

Aggregation server 220 may receive set up information from user device 210 in a manner similar to that described above (at block 715 of FIG. 7) that enables user device 210, for example, to retrieve and/or manage voicemail information associated with a landline device (e.g. a home telephone and/or an office telephone, etc.) and/or wireless device (e.g. user device 210 and/or other wireless devices). The set up information for FIG. 12 may include information associated with user device 210 (e.g., user device 210 MDN—703-567-8989), PIN, username and/or password, etc. as well as other devices associated with user device 210 such as a home landline telephone number (e.g. home telephone LDN—202-251-3434), PIN, username and/or password, and/or an office landline telephone number (e.g. office telephone LDN—202-345-9292), PIN, username and/or password, etc.

Aggregation server 220 may generate a notification table and may send set up information to landline VM server 240A associated with the home landline telephone, landline VM server 240B associated with the office landline telephone and/or wireless VM server 240C associated with user device 210. Aggregation server 220 may store the notification table in the wireless VVM database. The notification table may enable one or more backend wireless and/or landline VM servers 240A, VM server 240B, and/or VM server 240C to send voicemail notifications, using short message service (SMS), to user device 210 and/or aggregation server 220 when there is voicemail for the home telephone, office telephone and/or user device 210.

User device 210 may retrieve a voicemail list containing voicemail information associated with user device 210, home landline telephone and/or office landline telephone to be viewed, managed and/or retrieved in a manner similar to that described above in process 900 of FIG. 9A. For example, aggregation server 220 may receive a voicemail notification intended for user device 210 and may determine that the notification is associated with the user's home telephone. Similarly, aggregation server 220 may receive another voicemail notification and determine that the notification is associated with user device 210 in a manner similar to that described above (at block 904). Aggregation server 220 may authenticate user device 210 to landline VM server 240A and may pre-fetch voicemail header information associated with the user's home telephone, using HTTP/internet mobile access protocol (IMAP), from landline VM server 240A in a manner similar to that described above (at block 906). Similarly, aggregation server 220 may authenticate user device 210 to wireless VM server 240C and may pre-fetch voicemail header information associated with the user's device 210, using HTTP/IMAP, from wireless VM server 240C in a manner similar to that described above (at block 908).

Aggregation server 220 may receive the voicemail header information from landline VM server 240A and/or wireless VM server 240C and may temporarily store the voicemail header information in a message table corresponding to each landline and/or wireless device (e.g., landline home telephone and/or wireless telephone) associated with the user's landline office telephone. Aggregation server 220 may aggregate the message tables and may generate an aggregated voicemail notification, derived from the aggregated message table, associated with the home telephone and user device 110. Aggregation server 220 may generate notification user interface information and may send the notification user interface information and the aggregated voicemail notification, using SMS, for user device 210 to display.

Aggregation server 220 may manage communications to and from user device 210 and may aggregate multiple backend communications, using HTTP, with backend VM server 240 (e.g., VM server 240A, VM server 240B and/or VM server 240C), which may reduce network traffic, processing capacity and/or processing time needed by user device 210. For example, aggregation server 220 of FIG. 12 may be capable of retrieving voicemail information, through a series of communications with one or more landline and/or wireless backend VM servers 240. Aggregation server 220 may aggregate the retrieved voicemail information for user device 210 (e.g., aggregated voicemail notifications, voice-to-text translations, text-to-voice translations, message tables, voicemail lists and/or audio files, etc.) in only a fraction of the time or, with a minimal number of slower, more expensive and less secure device-to-peer communications if user device 210 were left to perform them. In this example, user device 210 may no longer need to process or manage multiple communications to and/or from backend VM servers 240, wireless notification server 230-1, landline notification server 230-2, landline retrieval server 250-2 and/or wireless retrieval server 250-1 due to aggregation server 220 taking on that function.

In other implementations, aggregation server 220 may reduce communications with backend VM server 240 (e.g., VM server 240A, VM server 240B and/or VM server 240C) by temporarily storing (e.g., caching) information or data in the wireless VVM database for future reuse that may reduce backend load. For example, aggregation server 220 may cache voicemail metadata, session cookies, information associated with user device 210 (e.g., user device 210 MDN, PIN, username, password, etc.).

The reduction in the number of communications, as discussed in the previous examples, may dynamically increase security of voicemail sessions by proportionally reducing number of communications required to perform authentications. Moreover, aggregation server 220 may simplify user device 210 authentication by the use of a session cookie, which reduces the number of communications that would otherwise be required to repeatedly retrieve information associated with user device 210 (user device 210 MDN, PIN, username and/or password) from VM server 240A, VM server 240B and/or VM server 240C and/or user device 210.

A flexible and scalable architecture of FIG. 12 may be enabled by aggregation server 220 as a memory-less device where persistent information may be stored in and/or retrieved from user device 210 or backend VM server 240 (e.g., VM server 240A, VM server 240B and/or VM server 240C). This architecture may protect against the loss of information, which may be recoverable merely by communicating with the backend VM server 240 and/or user device 210. Furthermore, aggregation server 220 may provide a more flexible and scalable architecture that may not be limited to the number of user devices (e.g., user device 210), notification servers 230, retrieval servers 250, and/or backend VM servers 240 with which to communicate and/or for which to perform aggregation operations (e.g., aggregating landline and/or wireless voicemail message tables, voicemail header information, audio files, etc.). For example, aggregation server 220 may provide scalability and flexibility where network capacity may be increased or decreased by merely adding, reducing or reconfiguring hardware (e.g., user device 210, wireless notification server 230-1, landline notification server 230-2, landline retrieval server 250-2, wireless retrieval server 250-1 and/or backend VM server 240).

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7, 9A and 9B, the order of the blocks may be modified in other implementations. Further, non-dependent blocks may be performed in parallel.

Also, it has been described that the notification server (i.e., wireless notification server 230-1 or landline notification server 230-2) performs certain functions and that the retrieval server (i.e., wireless retrieval server 250-1 or landline retrieval server 250-2) performs certain other functions. Any function described as being performed by the notification server may be performed by the retrieval server, and vice versa. In another implementation, a single device may perform all of the functions of both the notification server and the retrieval server.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as an ASIC or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system, comprising:
    at least one server connected to a plurality of voicemail servers, a first voicemail server, of the plurality of voicemail servers, providing voicemail services for a plurality of landline telephone devices, a second voicemail server, of the plurality of voicemail servers, providing voicemail services for a plurality of wireless telephone devices,
    the at least one server being to:
        receive, from the first voicemail server, information regarding a first voicemail intended for a user of a user device, the information regarding the first voicemail including a landline voicemail notification,
        receive, from the second voicemail server, information regarding a second voicemail intended for the user of the user device, the information regarding the second voicemail including a wireless voicemail notification,
        pre-fetch, from the first voicemail server, landline voicemail header information based on the landline voicemail notification,
        pre-fetch, from the second voicemail server, wireless voicemail header information based on the wireless voicemail notification,
        aggregate the information regarding the first voicemail and the information regarding the second voicemail as aggregated information,
        aggregate the pre-fetched landline voicemail header information and the pre-fetched wireless voicemail header information to form an aggregated voicemail notification, and
        send the aggregated information and the aggregated voicemail notification to the user device for display in a single list that includes the information regarding the first voicemail and the information regarding the second voicemail and permits selection of at least one of the information regarding the first voicemail and the information regarding the second voicemail for playback.

2. The system of claim 1, where the at least one server is further to:
    receive, from the user device, a request to retrieve a voicemail list, and
    generate, based on the request, an aggregated voicemail list from the aggregated information, where the aggregated voicemail list includes data associated with the first voicemail and data associated with the second voicemail.

3. The system of claim 2, where the at least one server is further to:
    obtain information associated with a voicemail list user interface, and
    send, to the user device, the aggregated voicemail list and the information associated with the voicemail list user interface.

4. The system of claim 1, where the at least one server is further to:
    receive, from the user device, an update message regarding an action performed on the first voicemail or the second voicemail,
    identify one of the first voicemail server or the second voicemail server to receive the update message, and
    send, to the identified one of the first voicemail server or the second voicemail server, the received update message.

5. The system of claim 1, where the at least one server is further to:
    receive, from the user device, a request to retrieve voicemail audio information associated with the first voicemail and the second voicemail,
    retrieve, from the first voicemail server, based on the request, landline audio information,
    retrieve, from the second voicemail server, based on the request, wireless audio information,
    aggregate the landline audio information and the wireless audio information into an aggregated audio file, and
    send the aggregated audio file to the user device.

6. The system of claim 1, where the at least one server is further to:
    authenticate the user of the user device to the first voicemail server and the second voicemail server.

7. The system of claim 1, where the at least one server is further to:
    receive, from the user device, a request for voicemail audio information associated with the first voicemail or the second voicemail,
    determine, based on the request, whether to retrieve the voicemail audio information from the first voicemail server or the second voicemail server, and
    retrieve the voicemail audio information from the first voicemail server or the second voicemail server.

8. The system of claim 1, where the at least one server is further to:
    obtain, from the user device, information associated with the user of the user device, and
    communicate with the first voicemail server or the second voicemail server, based on the information associated with the user, to set up voicemail services for the user.

9. A method performed by a server device in communication with a plurality of voicemail servers providing voicemail services to a plurality of user devices associated with a user, the method comprising:
    receiving, by the server device, a voicemail notification;
    receiving, by the server device and based on the voicemail notification, a request, from one of the plurality of user devices, for voicemail information corresponding to another one of the plurality of user devices;
    identifying, by the server device, one of the plurality of voicemail servers from which to retrieve the voicemail information based on the request and to pre-fetch voicemail header information based on the voicemail notification;
    pre-fetching, by the server device, the voicemail header information, from the one of the plurality of voicemail servers;
    retrieving, by the server device, the voicemail information from the one of the plurality of voicemail servers;
    generating, by the server device, information regarding a voicemail list based on the pre-fetched voicemail header information; and transmitting, by the server device, the voicemail information and the information regarding the voicemail list to the one of the plurality of user devices for display in a single list that includes the information regarding the voicemail information and permits selection of the information regarding the voicemail information for playback.

10. The method of claim 9, further comprising:
retrieving, by the server device, other voicemail information from another one of the plurality of voicemail servers corresponding to the one of the plurality of user devices;
aggregating, by the server device, the voicemail information and the other voicemail information into aggregated voicemail information; and
transmitting, by the server device, the aggregated voicemail information to the one of the plurality of user devices.

11. The method of claim 9, further comprising:
receiving, by the server device, an update message from the one of the plurality of user devices;
identifying, by the server device, a particular voicemail server, of the plurality of voicemail servers, to send the update message; and
sending, by the server device, the update message to the particular voicemail server.

12. The method of claim 9, further comprising:
authenticating, by the server device, the user associated with the plurality of user devices, to one or more of the plurality of voicemail servers.

13. The method of claim 9, further comprising:
obtaining, by the server device, information associated with the user associated with the plurality of user devices; and
communicating, by the server device, with one or more of the plurality of voicemail servers to set up voicemail services based the information associated with the user.

14. A server device comprising:
means for receiving a request for voicemail information;
means for communicating with a first voicemail server, of a plurality of voicemail servers, to obtain first voicemail information associated with a first one of a plurality of user devices;
means for communicating with a second voicemail server, of the plurality of voicemail servers, to obtain second voicemail information associated with a second one of the plurality of user devices, the second one of the plurality of user devices being different than the first one of the plurality of user devices, and the second one of the plurality of voicemail servers being different than the first one of the plurality of voicemail servers;
means for aggregating the first voicemail information and the second voicemail information to form aggregated information;
means for pre-fetching first voicemail header information based on the first voicemail information;
means for pre-fetching second voicemail header information based on the second voicemail information;
means for aggregating the pre-fetched first voicemail header information and the pre-fetched second voicemail header information to form aggregated voicemail information; and
means for outputting the aggregated information and the aggregated voicemail information for display in a single list that includes the information regarding the first voicemail information and the information regarding the second voicemail information and permits selection of at least one of the information regarding the first voicemail information and the information regarding the second voicemail information for playback.

15. The server device of claim 14, further comprising:
means for retrieving, via a plurality of data calls to another server device, visual user interface information; and
means for outputting the visual user interface information for presentation with the aggregated voicemail information.

16. A server device, connected to a plurality of voicemail servers and one of a plurality of user devices associated with a particular user, comprising:
a processor to:
receive a first voicemail notification associated with a first user device of the plurality of user devices;
receive a second voicemail notification associated with a second user device, of the plurality of user devices;
aggregate the first voicemail notification and the second voicemail notification to form an aggregated notification;
send the aggregated notification to the one of the plurality of user devices;
identify a first voicemail server, of the plurality of voicemail servers, that corresponds to the first voicemail notification, from which to pre-fetch first voicemail header information based on the first voicemail notification;
identify a second voicemail server, of the plurality of voicemail servers, that corresponds to the second voicemail notification, from which to pre-fetch second voicemail header information based on the second voicemail notification;
pre-fetch the first voicemail header information from the first voicemail server, and the second voicemail header information from the second voicemail server;
aggregate the first voicemail header information and the second voicemail header information to form aggregated voicemail information; and
send the aggregated voicemail information to the one of the plurality of user devices for display in a single list that includes the information regarding the first voicemail header information and the information regarding the second voicemail header information and permits selection of at least one of the information regarding the first voicemail header information and the information regarding the second voicemail header information for playback.

17. The server device of claim 16, where the processor is further to:
retrieve first voicemail audio information corresponding to the first voicemail header information, from the first voicemail server;
retrieve second voicemail audio information corresponding to the second voicemail header information, from the second voicemail server;
aggregate the first voicemail audio information and the second voicemail audio information into aggregated voicemail audio information; and
send the aggregated voicemail audio information to the one of the plurality of user devices.

18. The server device of claim 16, where the processor is further to:
receive an update message, from the one of the plurality of user devices, pertaining to an action taken on a voicemail associated with the first voicemail notification; and
send the update message to the first voicemail server.

19. The server device of claim 16, where the processor is further to:
   store voicemail information, in a memory, during a voicemail session associated with the one of the plurality of user devices; and
   erase the stored voicemail information, from the memory, when the voicemail session ends.

20. The server device of claim 14, further comprising:
   means for obtaining information associated with a user associated with one of the plurality of user devices; and
   means for receiving information to create voicemail services based the information associated with the user.

21. The server device of claim 16, where the processor is further to:
   obtain information associated with a user associated with the one of the plurality of user devices; and
   receive information to create voicemail services based the information associated with the user.

* * * * *